(12) United States Patent
Yokoyama et al.

(10) Patent No.: US 7,865,000 B2
(45) Date of Patent: Jan. 4, 2011

(54) MEDICAL IMAGE PROCESSING APPARATUS FOR ANALYZING PROPERTIES OF LIVING BODY BASED ON IMAGE DATA THEREOF

(75) Inventors: Toshiro Yokoyama, Fukuoka (JP); Masayoshi Kage, Fukuoka (JP)

(73) Assignee: Kurume University, Fukuoka (JP)

( * ) Notice: Subject to any disclaimer, the term of this patent is extended or adjusted under 35 U.S.C. 154(b) by 1017 days.

(21) Appl. No.: 11/628,955

(22) PCT Filed: Jun. 10, 2005

(86) PCT No.: PCT/JP2005/010693
§ 371 (c)(1),
(2), (4) Date: Jan. 23, 2007

(87) PCT Pub. No.: WO2005/121784
PCT Pub. Date: Dec. 22, 2005

(65) Prior Publication Data
US 2008/0267485 A1    Oct. 30, 2008

(30) Foreign Application Priority Data
Jun. 10, 2004    (JP)    ............... 2004-172669

(51) Int. Cl.
G06K 9/00    (2006.01)
G06K 9/36    (2006.01)
(52) U.S. Cl. ...................... 382/128; 382/249
(58) Field of Classification Search ............. 382/128, 382/249
See application file for complete search history.

(56) References Cited

U.S. PATENT DOCUMENTS
5,719,784 A  *  2/1998  Clark et al. ............... 702/28
(Continued)

FOREIGN PATENT DOCUMENTS
JP    11-120350    4/1999
(Continued)

OTHER PUBLICATIONS

Caldwell C B, Stapleton S J, Holdsworth D W, Jong R A, Weiser W J, Cooke C and Yaffe M J. Characterization of mammographic parenchymal pattern by fractal dimension. Phys Med Biol 1990; 35:235-247.*

(Continued)

Primary Examiner—Wenpeng Chen
(74) Attorney, Agent, or Firm—Wenderoth, Lind & Ponack, L.L.P.

(57) ABSTRACT

A medical image processing apparatus for analyzing properties of living body based on image data of the living body is provided. The medical image processing apparatus executes a predetermined image analysis processing on the image data of the living body, to obtain shape image data obtained by extracting a profile of the living body, and pattern image data obtained by extracting the pattern on the interior of the profile of the living body. A fractal dimension $D_A$ of the shape image data is calculated and a fractal dimension $D_B$ of the pattern image data is calculated based on the obtained shape image data and the pattern image data, and then, the index value CI is calculated which substantially excludes information of the shape image data and substantially includes information of the pattern of the pattern image data to judge the properties of the living body.

27 Claims, 17 Drawing Sheets

U.S. PATENT DOCUMENTS

| | | | |
|---|---|---|---|
| 5,787,201 A * | 7/1998 | Nelson et al. | 382/224 |
| 6,026,174 A | 2/2000 | Palcic et al. | |
| 6,993,187 B2 * | 1/2006 | Recht | 382/181 |
| 7,062,079 B2 * | 6/2006 | Recht | 382/133 |
| 7,596,250 B2 * | 9/2009 | Dioguardi et al. | 382/128 |
| 2006/0228008 A1 * | 10/2006 | Dioguardi et al. | 382/128 |

FOREIGN PATENT DOCUMENTS

| | | |
|---|---|---|
| JP | 2002-140692 | 5/2002 |
| WO | 03/009233 | 1/2003 |
| WO | 03/071468 | 8/2003 |

OTHER PUBLICATIONS

J. W. Baish and R. K. Jain, Fractals and cancer, Cancer Research, vol. 60, pp. 3683-3688, Jul. 15, 2000.*

Patent Cooperation Treaty (PCT) International Preliminary Report on Patentability, issued Dec. 14, 2006.

English translation of Toshiro Yokoyama, "*Nyugan Yogo Inshi to shite no Kaku Chromatin pattern no Fractal Kaiseki oyobi Keitaigakuteki Kento*", Nippon Rinsho Saibo Gakkai Zasshi, May 22, 2004, p. 140.

English translation of Takeshi Hara, "*Nyubo X-sen Shashin ni okeru Shuryu In' ei no Ryoakusei Kanbetsu System no Kaihatsu*", Medical Imaging Technology, 1999, vol. 17, No. 5, pp. 577-584.

Yoshimasa Tanba, "*Digital Gazo o Mochiita Lymphocyte Kaku Kozo no Fractal Jigen no Sokutei*", Shinryo Byori, 2002, vol. 50, No. 7, pp. 702-705.

Hai-Shan Wu, "*Region Growing Region Growing Segmentation of Chromatin Clumps of Ovarian Cells Using Adaptive Gradients*", Journal of Imaging Science and Technology, Mar. 23, 2004, vol. 48, No. 1., pp. 22-27.

Vadim Backman, "*Measuring Cellular Structure at Submicrometer Scale with Light Scattering Spectroscopy*", 2001, vol. 7, No. 6, pp. 887-893.

William H. Wolberg, et al., "*Breast Cytology Diagnosis with Digital Image Analysis*", Breast Cytology Diagnosis, vol. 15, No. 6, Dec. 1993.

Simon S. Cross, "*Fractals in Pathology*", Journal of Pathology, vol. 182, pp. 1-8, 1997.

Hideki Takayasu et al., "*Application of Fractal Image Analysis of Cytologic Diagnosis*", Medical Imaging Technology, vol. 15, No. 5, pp. 587-591, Sep. 1997.

Andrew J. Einstein, et al., "*Fractal Characterization of Chromatin Appearance for Diagnosis in Breast Cytology*", Journal of Pathology, vol. 185, pp. 366-381, 1998.

European Search Report issued Jul. 1, 2010 in European (PCT) Application No. JP2005010693.

Ruey-Feng Chang, et al. "Breast Ultrasound Image Classification Using Fractal Analysis", Proceedings of the Fourth IEEE Symposium on Bioinformatics and Bioengineering (BIBE '04) (May 19, 2004). pp. 100-107.

* cited by examiner

Fig.8

| | CASE | AVERAGE AGE | AVERAGE TUMOR DIAMETER |
|---|---|---|---|
| RECURRENT EXAMPLES | n=14 | 55.0 | 4.2cm |
| NON-RECURRENT EXAMPLES n1 | n=24 | 54.7 | 3.6cm |
| NON-RECURRENT EXAMPLES n0 | n=31 | 56.6 | 2.5cm |
| (NOTE) PRIMARY LESION BEFORE RECURRENCE IS USED AS MEASURING SPECIMEN | | | |

Fig.10

| | Clthr≧0.2 | Clthr<0.2 | SUM |
|---|---|---|---|
| ESTIMATION OF RECURRENCES | | | |
| RECURRENT EXAMPLES | 12 | 2 | 14 |
| NON-RECURRENT EXAMPLES | 16 | 39 | 55 |

DISEASE SENSITIVITY RATE = 12／14 = 85.7％
DISEASE SPECIFICITY RATE = 39／55 = 71％
DISEASE ACCURACY RATE = 51／69 = 74％

Fig.11

| CHANGE IN ACCURACY DUE TO CHANGE OF THRESHOLD VALUE | | | | |
|---|---|---|---|---|
| | ESTIMATION OF LYMPH NODE METASTASIS | | ESTIMATION OF RECURRENCES | |
| | Cltht=0.15 | Cltht=0.2 | Clthr=0.15 | Clthr=0.2 |
| DISEASE SENSITIVITY RATE | 71.5% | 51% | 85.7% | 85.7% |
| DISEASE SPECIFICITY RATE | 50% | 71% | 45% | 71% |
| DISEASE ACCURACY RATE | 60% | 61% | 53% | 74% |

A  NON-RECURRENCE EXAMPLES          B  RECURRENCE EXAMPLES
            0.0366                              0.3839

MEDICAL IMAGE PROCESSING APPARATUS FOR ANALYZING PROPERTIES OF LIVING BODY BASED ON IMAGE DATA THEREOF

TECHNICAL FIELD

The present invention relates to medical image processing systems for processing medical image data related to a living body, in particular, to a medical image processing apparatus, a medical image processing method, and a medical image processing program for judging properties of the living body based on a fractal dimension of medical image data related to the living body, as well as to a computer readable recording medium as recorded with the medical image processing program.

BACKGROUND ART

Since the fractal theory was proposed in 1975, the basic research on the fractal theory has been advanced in the 90s, and is being widely used in the field of natural science in this century, however, not many specific applications have been found under the circumstances. In the fractal theory, when it is configured by a number $a^D$ of homothetic figures as obtain by reducing the whole to 1/a, the index D means a dimension, or is called a fractal dimension. This dimension does not need to be an integer, and a complicated distribution may be quantified by a non-integer dimension (See, e.g., a Non-patent document 2).

Various kinds of analyzing methods using the fractal dimension theory have been frequently used in the field of pathological diagnosis. An amorphous discrimination method and an amorphous discrimination apparatus have been proposed that uses the properties that benign tumor cells have strong coupling force between cells, and tends to have a relatively smooth shape in which the obtained cell clusters are closely attached, and that malignant tumor cells have weak coupling force and thus have a large spread of the cell cluster and a more complex shape to discriminate benignity/malignancy of the cell cluster by automatically performing amorphous analysis and not by making a judgment based on subjectivity or experience of humans (See, e.g., a Patent document 1 and a Non-patent document 3).

Further, numerical representation of the grade of malignancy of the lactiferous duct cancer using the fractal dimension has been attempted in a Non-patent document 4. In the research of the Non-patent document 4, the research report on using the fractal analysis to numerically describe the aspect of chromatin in breast cytology has been proposed, where the nucleus images by aspiration biopsy cell diagnosis of the breast for 19 patients whose lesion of epithelial cell is benign and 22 patients with infiltrative lactiferous duct cancer are characterized by fractal Minkowski dimension and the spectral dimension. The aspect of chromatic in the nucleus image of the mammary gland epithelial cell has been proved to be fractal, suggesting that the three-dimensional configuration of the chromatic in the epithelial cell also has a fractal property. A statistically significant difference has been proven to exist in an average spectral dimension between the benign tumor and the malignant tumor, and this leads to discovering a very weak correlation between the two fractal dimensions.

Furthermore, in a Patent document 2, a medical image processing apparatus is disclosed to provide information more effective in identifying the disease by standardizing the image analysis results that tend to be unstable due to dye and setting conditions of the microscope by using the analysis results of non-target cells in the blood smear. The medical image processing apparatus is, in view of achieving the above aim, characterized in that the image analysis that is not influenced by the dye or the setting condition of the microscope is performed by image processing the lymphocyte cell nucleus in addition to the neutrophilic cells to be performed by the image processing, and standardizing the image analysis results of the neutrophilic cell nucleus using the image analysis results as obtained from lymphocyte cell nucleus. Concretely, the medical image processing apparatus is provided for identifying the object using image information, and includes an image cut-out part for cutting out the region where the object is present from the input image, and a luminance information calculating part for extracting the profile of the cut out object and calculating the luminance of the extracted portion and the information analyzed based thereon.

Patent document 1: Japanese patent laid-open publication No. JP-11-120350-A;

Patent document 2: Japanese patent laid-open publication No. JP-2002-140692-A;

Non-patent document 1: William H. Wolberg, et al., "Breast Cytology Diagnosis with Digital Image Analysis", Breast Cytology Diagnosis, Vol. 15, No. 6, December 1993;

Non-patent document 2: Simon S. Cross, "Fractals In Pathology", Journal of Pathology, Vol. 182, pp. 1-8, 1997;

Non-patent document 3: Hideki Takayasu et al., "Application of Fractal Image Analysis to Cytologic Diagnosis", Medical Imaging Technology, Vol. 15. No. 5, pp. 587-591, September, 1997; and Non-patent document 4: Andrew J. Einstein, et al., "Fractal Characterization of Chromatin Appearance for Diagnosis in Breast Cytology", Journal of Pathology, Vol. 185, pp. 366-381, 1998.

DISCLOSURE OF THE INVENTION

The cells active in malignant cells have been known to have the gene abnormality protein transcription increasing, and tend to be distributed as abnormal agglomeration of protein molecules related to the transcription factor or the like within the cell nucleus, and further, such distribution has been known to be complicated. Conventionally, the distribution abnormality was macroscopically observed by the observer, and judged by an ambiguous and subjective judgment by words based on experience. For example, in morphological diagnosis of chromatin distribution for discriminating the chromatin distribution in cell nucleus as benign or malignant cells or estimating the grade of malignancy, the distribution was subjectively distinguished with the morphological features such as small granulated shape and rough mesh shape based on the experience of the observer.

An objective index can be provided if the chromatin distribution that is morphologically difficult to estimate is made into numerical values. Using the chromatin distribution of cell nucleus for estimating the grade of malignancy requires careful observation based on the experience of the observer, however, more accurate and reproducible estimation is difficult. Disclosure is made in use for the pathological diagnosis using the fractal dimension, which is simply a qualitative diagnosis on whether benign or malignant.

An objective of the present invention is to dissolve the above problems, and to provide a medical image processing apparatus and method, and a medical image processing program for quantitatively judging properties of a living body with accuracy higher that of the prior art, as well as to a recording medium recorded with the medial image processing program.

MEANS FOR DISSOLVING THE PROBLEMS

According to a medical image processing apparatus of the first invention, there is provided a medical image processing apparatus for analyzing properties of living body based on image data of the living body. The medical image processing apparatus includes image analyzing means, calculation means, and judgment means. The image analyzing means executes a predetermined image analysis processing on the image data of the living body, to obtain shape image data obtained by extracting a profile of the living body, and pattern image data obtained by extracting a pattern on an interior of the profile of the living body. The calculation means calculates a fractal dimension $D_A$ of the shape image data, and calculates a fractal dimension $D_B$ of the pattern image data based on the obtained shape image data and the pattern image data, and then, calculates an index value CI which substantially excludes information of the shape image data, and substantially includes information of pattern of the pattern image data based on the fractal dimension $D_A$ of the shape image data and the fractal dimension $D_B$ of the pattern image data. The judgment means judges the properties of the living body based on a calculated index value.

In the above-mentioned medical image processing apparatus, the calculation means calculates the index value CI using an equation of $CI=bD_B-aD_A$ (where "a" is a predetermined first constant, and "b" is a predetermined second constant). Or, in the above-mentioned medical image processing apparatus, the calculation means calculates the index value CI using an equation of $CI=(bD_B-aD_A)/cD_A$ (where "a" is a predetermined first constant, "b" is a predetermined second constant, and "c" is a predetermined third constant). Otherwise, in the above-mentioned medical image processing apparatus, the calculation means calculates the index value CI using an equation of $CI=dD_B/D_A$ (where "d" is a predetermined fourth constant). In stead of this, in the above-mentioned medical image processing apparatus, the calculation means calculates the index value CI using an equation of $CI=eD_A/D_B$ (where "e" is a predetermined fifth constant).

In addition, in the above-mentioned medical image processing apparatus, the judgment means judges the properties of the living body by comparing the calculated index value with a predetermined threshold value. In this case, the threshold value is preferably a value defined in advance for distinguishing the properties of the living body based on a plurality of image data of the living body where properties of the living body are known.

Further, in the above-mentioned medical image processing apparatus, the image analysis processing includes at least one processing of edge processing and binarization processing. Furthermore, the image analysis processing preferably further includes a conversion processing from color image data to gray scale image data.

In addition, in the above-mentioned medical image processing apparatus, the living body is a cell nucleus, the image data of the living body is chromatin image data of the cell nucleus, and the pattern image data of the living body is chromatin pattern image data of the cell nucleus. The judgment means judges biological estimation of the cell nucleus based on the calculated index value. In this case, the biological estimation is preferably a grade of malignancy of cancer of the cell nucleus.

Further, in the above-mentioned medical image processing apparatus, the living body is a region of a part of an organism, and the image data of the living body is obtained by imaging the region of one part with a medical image pick-up equipment for imaging with a predetermined signal wave. In this case, preferably, the living body is an organ of an organism, the shape image data is image data of shape of the organs, the pattern image data is image data indicating distribution of unevenness of a lesion part in the organs. The judgment means judges the biological estimation of the lesion part in the organs based on the calculated index value.

According to a medical image processing method of the second invention, there is provided a medical image processing method for analyzing properties of living body based on image data of the living body. The method includes steps of executing, calculating, and judging. The executing step includes a step of executing a predetermined image analysis processing on the image data of the living body, to obtain shape image data obtained by extracting a profile of the living body, and pattern image data obtained by extracting a pattern on an interior of the profile of the living body. The calculating step includes a step of calculating a fractal dimension $D_A$ of the shape image data, and calculating a fractal dimension $D_B$ of the pattern image data based on the obtained shape image data and the pattern image data, and then, calculating an index value CI which substantially excludes information of the shape image data, and substantially includes information of pattern of the pattern image data based on the fractal dimension $D_A$ of the shape image data and the fractal dimension $D_B$ of the pattern image data. The judging step includes a step of judging the properties of the living body based on a calculated index value.

In the medical image processing method, the calculation step calculates the index value CI using an equation of $CI=bD_B-aD_A$ (where "a" is a predetermined first constant, and "b" is a predetermined second constant). Or, in the medical image processing method, the calculation step calculates the index value CI using an equation of $CI=(bD_B-aD_A)/cD_A$ (where "a" is a predetermined first constant, "b" is a predetermined second constant, and "c" is a predetermined third constant). Otherwise, in the medical image processing method, the calculation step calculates the index value CI using an equation of $CI=dD_B/D_A$ (where "d" is a predetermined fourth constant). In stead of this, the calculation step calculates the index value CI using an equation of $CI=eD_A/D_B$ (where "e" is a predetermined fifth constant).

In addition, in the medical image processing method, the judgment step judges the properties of the living body by comparing the calculated index value with a predetermined threshold value. In this case, the threshold value is preferably a value defined in advance for distinguishing the properties of the living body based on a plurality of image data of the living body where properties of the living body are known.

Further, in the medical image processing method, the image analysis processing includes at least one processing of edge processing and binarization processing. Furthermore, the image analysis processing preferably further includes a conversion processing from color image data to gray scale image data.

In addition, in the medical image processing method, the living body is a cell nucleus, the image data of the living body is chromatin image data of the cell nucleus, and the pattern image data of the living body is chromatin pattern image data of the cell nucleus. The judgment step judges biological estimation of the cell nucleus based on the calculated index value. In this case, the biological estimation is preferably a grade of malignancy of cancer of the cell nucleus.

Further, in the medical image processing method, the living body is a region of a part of an organism, and the image data of the living body is obtained by imaging the region of one part with a medical image pick-up equipment for imaging with a predetermined signal wave. In this case, the living body is preferably an organ of an organism, the shape image data is image data of shape of the organs, the pattern image data is image data indicating distribution of unevenness of a lesion part in the organs. The judgment step judges the biological estimation of the lesion part in the organs based on the calculated index value.

According to an image processing program of the third invention, there is provided an image processing program including respective steps of the medical image processing method.

According to a computer readable recording medium of the fourth invention, there is provided a computer readable recording medium for recording the image processing program therein.

EFFECTS OF THE INVENTION

Therefore, according to the medical image processing apparatus and method according to the present invention, the predetermined image analysis processing is performed on the image data of the living body to obtain the shape image data obtained by extracting the profile of the living body, and the pattern image data obtained by extracting the pattern on the interior of the profile of the living body. The fractal dimension $D_A$ of the shape image data is calculated and the fractal dimension $D_B$ of the pattern image data is calculated based on the obtained shape image data and the pattern image data, and then, the index value CI is calculated, which substantially excludes the information of the shape image data, and substantially includes the information of the pattern of the pattern image data, based on the fractal dimension $D_A$ of the shape image data and the fractal dimension $D_B$ of the pattern image data. Furthermore, the properties of the living body are judged based on the calculated index value. Accordingly, since the index value CI is calculated, which substantially excludes the information of the image data related to the shape of the living body and substantially includes the information of the pattern of the pattern image data, and the properties of the living body are judged based on the calculated index value, the properties of the living body are judged quantitatively with accuracy higher than that of the prior art and with an extremely simple processing method.

BRIEF DESCRIPTION OF THE DRAWINGS

FIG. 8 is a table showing cases according to an implemental example 1;

FIG. 10 is a table showing results for estimation recurrence, which are the results of the processing for analysis and estimation for the cell nuclei of the cases according to an implemental example 2;

FIG. 11 is a table showing a change in accuracy due to change in the threshold value, which is the result of the processing for analysis and estimation for the cell nuclei of the cases according to the implemental example 2;

DESCRIPTION OF NUMERICAL REFERENCES

1 . . . Microscope,
2 . . . CCD digital camera,
2a . . . Communication interface,
10 . . . Medical image processing apparatus,
20 . . . CPU,
21 . . . ROM,
22 . . . RAM,
23 . . . Image memory,
24 . . . Program memory,
30 . . . Bus,
31 . . . Keyboard Interface,
32 . . . Mouse interface,
33 . . . Display Interface,
34 . . . Printer interface,
35 . . . Drive unit interface,
41 . . . Keyboard,
42 . . . Mouse,
43 . . . CRT display,
44 . . . Printer,
45 . . . CD-ROM drive unit,
45a . . . CD-ROM,
50 . . . Communication cable,
51 . . . Communication interface, and
60 . . . Image pick-up apparatus.

BEST MODE FOR CARRYING OUT THE INVENTION

Embodiments according to the present invention will be described hereinafter with reference to the drawings.

Lymph node metastasis, expression of estrogen receptor, expression of excess Her-2, and histological grade have been known as breast cancer prognostic estimation factors, and recurrence risk items are given importance in the treatment policy. The mammary gland aspiration biopsy cell diagnosis is given reliability for the benign or malignant diagnosis before operation, however, estimation as prognostic estimation factor has not been made. The inventors have performed fractal analysis in an aim of clarifying whether or not the chromatin pattern of the nucleus of cancerous cells of the mammary gland aspiration biopsy material can act as the recurrence prognostic factor. As a result of estimating the chromatin distribution of the cell nucleus as the biological degree of activity and the proliferation potency of the cell, increase in the fractal dimensionality was observed for the breast cancer recurrent examples, and discovered it to be the finding that suggests the biological grade of malignancy, and this leads to completion of the medical image processing system according to the embodiment of the present invention.

Figure 1:
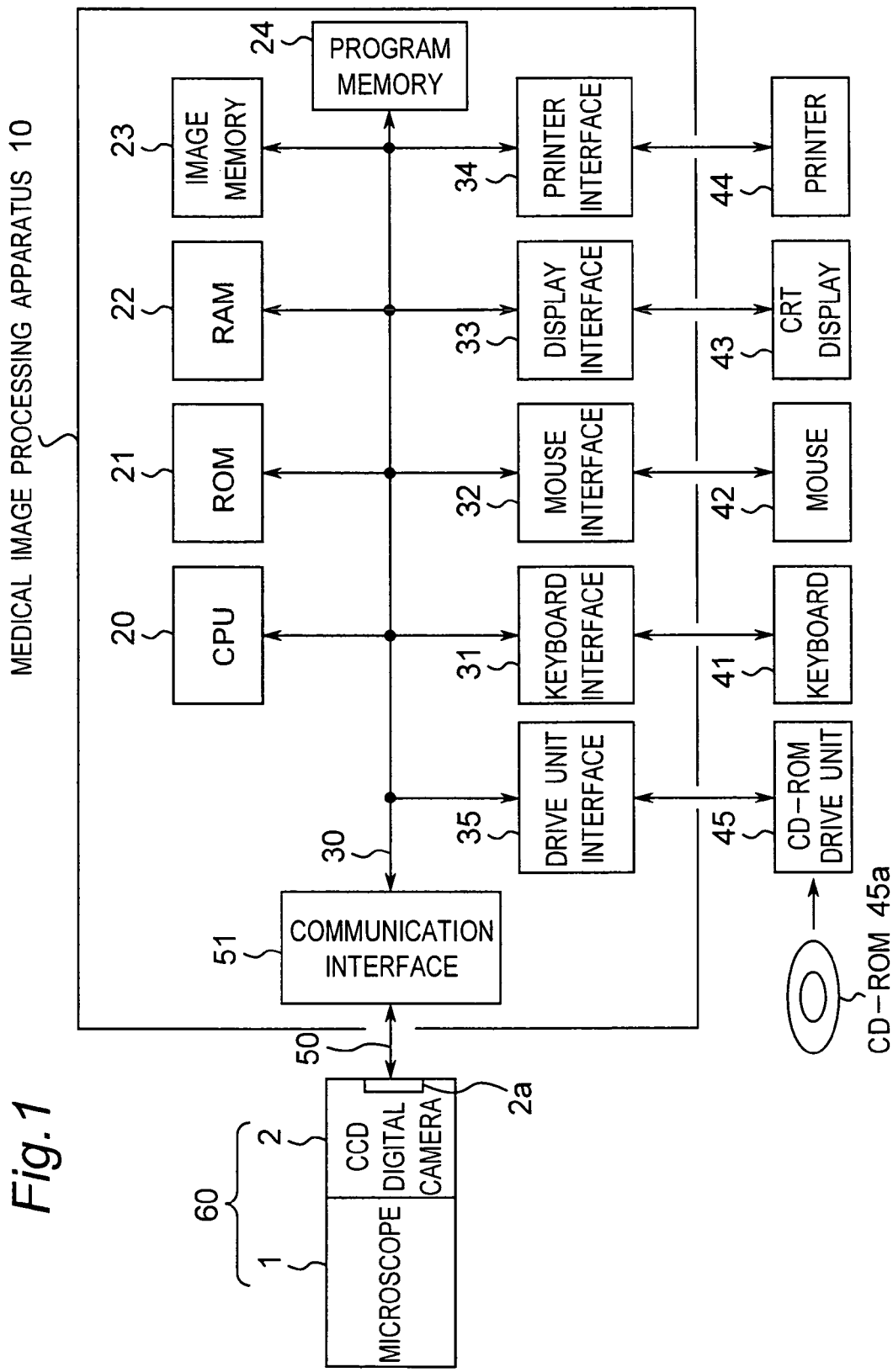
FIG. 1 is a block diagram showing a configuration of a medical image processing system including a medical image processing apparatus 10 for executing a processing for analyzing and estimating chromatin pattern image data of cell nuclei of an organism according to one embodiment of the present invention.
Figure 2:
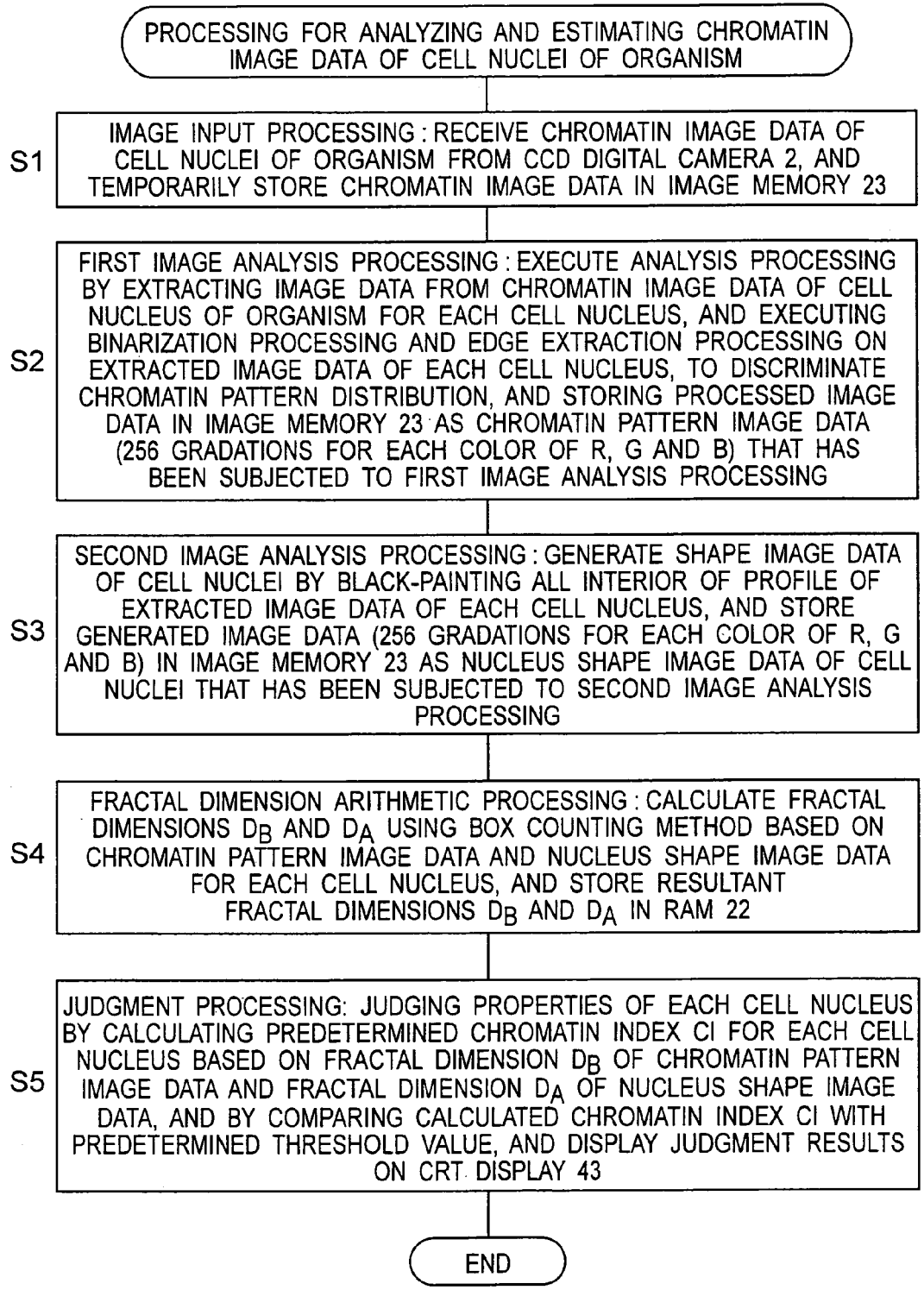
FIG. 2 is a flow chart of a main flow showing a processing for analyzing and estimating chromatin pattern image data of cell nuclei of the organism, which is executed by the medical image processing apparatus 10 of FIG. 1.

FIG. 1 is a block diagram showing a configuration of a medical image processing system including a medical image processing apparatus 10 for executing a processing for analyzing and estimating the chromatin pattern image data of the cell nuclei of an organism. FIG. 2 is a flowchart of a main flow showing a processing for analyzing and estimating chromatin pattern image data of cell nuclei of an organism executed by the medical image processing apparatus 10 of FIG. 1. The medical image processing apparatus 10 according to the present embodiment executes an image input processing (S1), a first image analysis processing (step S2), a second image analysis processing (step S3), a fractal dimension arithmetic processing (step S4), and a judgment processing (step S5) in the processing for analyzing and estimating the chromatin image data of the cell nuclei of the organism of FIG. 2, to judge the properties such as grade of malignancy of the cell nuclei of the organism, and outputs and displays the judgment results to and on a CRT display 43, respectively.

The image processing system of the present embodiment is constituted to be broadly divided into the following:

(a) an imaging pick-up apparatus 60 configured by attaching a light receiving lens of a CCD digital camera 2 to a visible portion of a microscope 1; and (b) the medical image processing apparatus 10 configured by a digital calculator, for executing the processing for analyzing and estimating the chromatin pattern image data of the cell nuclei of the organism, as shown in FIG. 2, based on the image data including the image of a living body such as the cell nuclei of breast cancer or the like, to judge the properties such as grade of malignancy of the cell nuclei of the organism, and outputting and displaying the judgment results.

A communication interface 2a in the CCD digital camera 2 of the imaging pick-up apparatus 60 and a communication interface 51 of the medical image processing apparatus 10 are connected by way of a communication cable 50. The communication interfaces 2a and 51 are each an interface unit such as a USB (Universal Serial Bus) interface, a LAN (Local Area Network) interface etc. The image data including the cell nuclei of breast cancer or the like imaged by the CCD digital camera 2 using the microscope 1 is transmitted to the medical image processing apparatus 10 from the imaging pick-up apparatus 60, and then, is received by the medical image processing apparatus 10, which then performs the image processing.

The configuration of the medical image processing apparatus 10 will be described hereinafter with reference to FIG. 1. The medical image processing apparatus includes the following:

(a) a CPU (Central Processing Unit) 20 of a computer for calculating and controlling the operations and processings of the medical image processing apparatus 10;

(b) a ROM (Read-Only Memory) 21 for storing a basic program such as operation program and the data required for executing the same program;

(c) a RAM (Random Access Memory) 22, for operating as a working memory of the CPU 20, and temporarily storing parameters and data required for the image processing;

(d) an image memory 23, configured by a hard disc memory or the like, for storing MRI image data received from the CCD digital camera 2, the image data as used during the image processing, and the image data after the image processing;

(e) a program memory 24, configured by a hard disc memory or the like, for storing an image processing program of FIG. 2 which is read in using a CD-ROM drive unit 45;

(f) a communication interface 51, connected to the communication interface 42a of the CCD digital camera 2 of the imaging pick-up apparatus 60, for transmitting and receiving data with the communication interface 2a;

(g) a keyboard interface 31, connected to a keyboard 41 for inputting predetermined data or instruction command, for receiving data or instruction command inputted from the keyboard 41, performing an interface processing such as a predetermined signal conversion, and transmitting the results to the CPU 20;

(h) a mouse interface 32, connected to a mouse 42 for inputting instruction command on the CRT display 43, for receiving data or instruction command inputted from the mouse 42 and performing an interface processing such as a predetermined signal conversion and transmitting the results to the CPU 20;

(i) a display interface 33, connected to the CRT display 43 for displaying image data processed by the CPU 20, setting instruction screen or the like, converting the image data to be displayed to an image signal for the CRT display 43, and outputting and displaying the results to and on the CRT display 43, respectively;

(j) a printer interface 34, connected to a printer 44 for printing image data processed by the CPU 20, a predetermined analysis results or the like, for performing a predetermined signal conversion or the like on the printing data to be printed, and outputting and printing the results to the printer 44; and (k) a drive unit interface 35, connected to the CD-ROM drive unit 45 for reading program data of the image processing program from the CD-ROM 45a storing the image processing program, for performing a predetermined signal conversion or the like on the program data of the read image processing program, and transferring the results to the program memory 24.

In the present embodiment, these circuits 20 to 24, 31 to 34 and 51 are connected via a bus 30.

In the present embodiment, after the image data of the cell nuclei of the organism generated by the CCD camera 2 of the imaging pick-up apparatus 60 is transmitted from the communication interface 2a of the CCD digital camera 2 to the communication interface 51 of the medical image processing apparatus 10 via the communication cable 50, the image data is temporarily stored in the image memory 23 for image processing (step S1 of FIG. 2).

The processing for analyzing and estimating the chromatin image data of the cell nuclei of the organism according to the present embodiment will be described hereinafter with reference to FIG. 2, using the image processing on the chromatin image data of the breast cancer by way of example. As a pre-processing to be executed before executing the image processing, the cytological specimen of the breast cancer is dyed by a known dyeing method (e.g., Papanicolaou method) using hematoxylin (basic dye of cobalt blue) to obtain the cytological specimen of the breast cancer in which the cell nuclei are dyed. The cytological specimen of the breast cancer in which the cell nuclei have been dyed is imaged using the CCD digital camera 2 through the microscope 1, after the chromatin image data of the imaged breast cancer is obtained. Thereafter, the chromatin image data is transmitted from the communication interface 2a of the CCD digital camera 2 to the communication interface 51 of the medical image processing apparatus 10 via the communication cable 60.

At step S1 of FIG. 2, the image input processing is executed. That is, the chromatin image data of the cell nuclei of the organism is received from the CCD digital camera 2, and is temporarily stored in the image memory 23. The imaging pick-up apparatus 60 including the microscope 1 and the CCD digital camera 2 is used in the present embodiment, however, the present invention is not limited thereto, and imaging or picking-up an image may be performed by directly using the imaging pick-up apparatus such as a CCD camera, a scanner, or a digital camera or the like.

At step S2, the first image analysis processing is executed. That is, the analysis processing is executed by extracting the image data from the chromatin image data of the cell nuclei of the organism for each cell nucleus, executing a binarization processing using a predetermined threshold value and an edge extraction processing on the extracted image data of each cell nucleus, to discriminate the chromatin pattern distribution. Then the processed image data is stored in the image memory 23 as the chromatin pattern image data (256 gradations for each of the colors of R, G and B) that has been subjected to the first image analysis processing. In order to automatically extract each image data from the chromatin image data of the cell nuclei of the organism for each cell nucleus preferably along the profile of each cell nucleus, the known method described in the non-patent document 1, for example, is used. The image data of each cell nucleus may be extracted by manually specifying the profile of each cell nucleus. Furthermore, at least one processing of the binarization processing and the edge extraction processing may be executed, or an image conversion processing for converting the color image data to the image data of gray scale of each color may be further executed in addition to the at least one processing of the binarization processing and the edge extraction processing. In this case, the image conversion processing is preferably executed after the edge extraction processing is executed on the image data of the cell nuclei, and the binarization processing is executed with an arbitrary gradation of the dye gradation gradient of the cell nucleus as the threshold value.

At step S3, the second image analysis processing is executed. That is, the shape image data of the cell nuclei is generated by black painting all the interior of the profile of the extracted image data of each cell nucleus, and the generated image data (256 gradations for respective colors of R, G and B) is stored in the image memory 23 as the nucleus shaped image data of the cell nuclei that has been subjected to the second image analysis processing.

Figure 6:
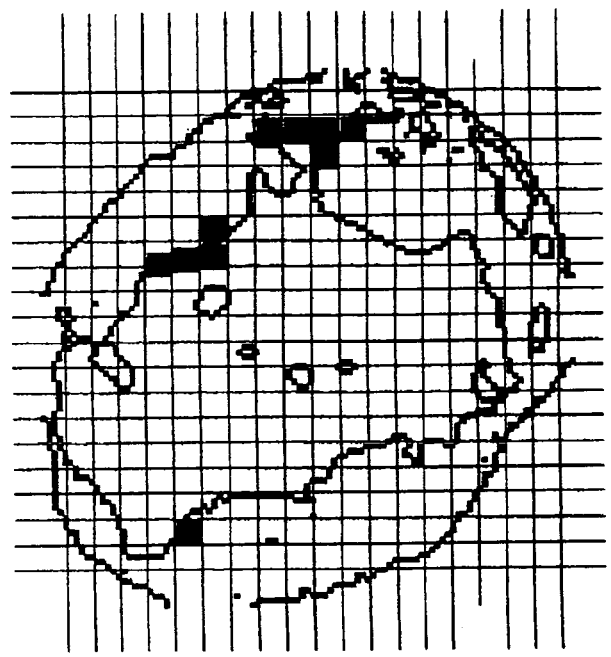
FIG. 6 is a schematic analysis diagram showing a principle of a fractal dimension analysis processing by a box counting method for use in the fractal arithmetic processing of FIG. 2.
Figure 7:
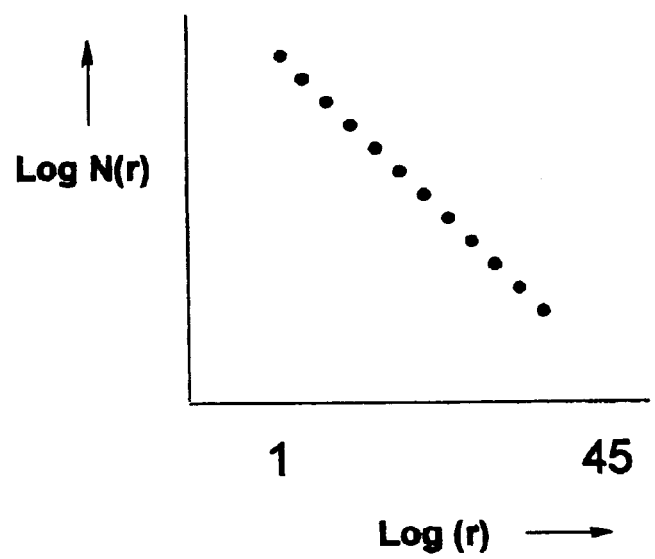
FIG. 7 is a graph showing a logarithmic value Log N(r) of the number of cells with respect to the logarithmic value Log (r) of the length r of one side of the segmented squares, which is a fractal dimension analysis processing result example by the box counting method of FIG. 6.

At step S4, the fractal dimension arithmetic processing is executed. That is, respective fractal dimensions $D_A$ and $D_B$ are calculated using a box counting method or the like based on the chromatin pattern image data and the nucleus shaped image data for each cell nucleus, and then, the calculation results are stored in the RAM 22. In the fractal dimension arithmetic processing, the fractal dimension of the image data is calculated by the box counting method with respect to the image data that has been subjected to the image analysis processing. The box counting method is a common method for obtaining the fractal dimension from the digital image. In the box counting method, the squares each having a side of length "r" and the figure are overlapped, as shown in FIG. 6, and the number of cells containing even a small amount of the target object is counted as N(r) when the length of one side of the segmented square is "r". As shown in FIG. 7, when plotting the logarithm of the length of one side of the segmented square (size of segmented square) in the horizontal axis, and plotting the logarithm of the number of squares 25 overlapping the figure taken in the vertical axis, the line having a negative slope is obtained, and this slope becomes a fractal dimension. The slope of the graph is determined by the least-squares method or the like since fluctuation occurs when analyzing the actual image data. The box counting method is used in the present embodiment, however, the present invention is not limited thereto, and other methods such as Hausdorff dimension method may be used.

At step S5, the judgment processing is performed. That is, the properties of each cell nucleus are judged by calculating the predetermined chromatin index CI using an equation (1) for each cell nucleus based on the fractal dimension $D_B$ of chromatin pattern image data and the fractal dimension $D_A$ of the nucleus shaped image data, and by comparing the calculated chromatin index CI with a predetermined threshold value, and then, the judgment results are displayed on the CRT display 43. The chromatin index CI may be displayed since the chromatin index CI indicates the degree of the properties of the cell nucleus. The properties of the cell nucleus may be interpreted so as to include the meaning of the degree thereof.

$$CI = bD_B - aD_A \quad (1),$$

where "a" is a predetermined first constant, and "b" is a predetermined second constant. Preferably, in the present embodiment, a=1, and b=1, for example. In the calculation of the fractal dimension $D_B$ of the chromatin pattern image data of each cell nucleus, for the image data of three colors of R, G, and B of the chromatin pattern image data of each cell nucleus, the threshold value of the binarization processing is set shifted by each 10 gradations between 80 gradations and 150 gradations, for example, and the maximum fractal dimension out of the values of a number 24 (=8×3) of the obtained fractal dimensions is preferably set as the fractal dimension $D_B$. In the calculation of the fractal dimension $D_A$ of the nucleus shaped image data, since the same nucleus shaped image data is the image data having distinct white and black colors, for example, 130 gradations can be set as one threshold value to calculate one fractal dimension $D_A$. In the present embodiment, the value of the chromatin index CI substantially excludes the information of the nucleus shaped image data, and substantially includes or contains the information of the pattern of the pattern image data by calculating the chromatin index CI using the equation (1). In other words, the fractal dimension $D_B$ of the chromatin pattern image data indicates the complexity of the chromatin distribution, and the fractal dimension $D_A$ of the nucleus shaped image data indicates the complexity of only the nucleus shape, and this leads to that the chromatin index CI becomes the numerical value indicating the complexity of only the chromatin distribution.

The chromatin index value CI will be described in detail hereinafter. The chromatin index is an index applied with "self-shape differential method", which is able to provide the shape information with reduced shape error and shape error from a plurality of information of a cell shape. In the chromatin index (using self-shape differential method), the cell and the nucleus shape are originally made up of a specific shape (nucleus shape) and a plurality of shape information such as in-nucleus protein distributed therein, and thus, the relationship between the nucleus shape and the property shape of the chromatin cannot be ignored. That is, since the configuration (or shape) appears with a plurality of configuration elements forming a shape, different properties are extracted to eliminate or exclude the influence between the respective parameters. This is referred to as self-shape differential method. An accurate estimation of the chromatin distribution can be done by using the chromatin index CI (using self-shape differential method). The this is a method in which the configuration parameter is subtracted from them, and the dimensional difference thereof is used for the estimation since the plurality of parameters obtained from the same configuration influence each parameter.

The non-patent document 4 is previously disclosed as an example of the report of the prior art, however, the present document describes only using the fractal dimension analysis on the estimation of the nucleus chromatin with respect to the discrimination diagnosis of benign or malignant. In the document, the influence of the nucleus shape is not taken into consideration when estimating the nucleus chromatin. In particular, since the shape of the cell nucleus of a malignant example shows an indeterminate shape, the influence of the nucleus shape must be eliminated when estimating the nucleus chromatin. In the discrimination of benign or malignant, the irregularity of the nucleus is not shown in the benign example. In this case, the nucleus shape mostly shows a circle formed by a smooth line, and on the other hand, the nucleus shape of the malignant example mostly shows an indefinite shape with a rough line. Therefore, the exterior shape enveloping the chromatin distribution is desirably corrected in the estimation. On the other hand, the embodiment according to the present invention provides a method (self-shape differential method) of the fractal dimension analysis as the estimation of the grade of malignancy and eliminating the influence of irregularity of the nucleus shape when estimating the nucleus chromatin shape, and this leads to estimation of the grade of malignancy. The estimation of recurrence and lymph node metastasis are indicated as an index for the grade of malignancy, and the nucleus chromatin distribution is estimated as the index thereof.

That is, in the non-patent document 4, the analysis of the nucleus chromatin distribution that does not take the nucleus shape into consideration is performed in an aim of only discriminating between benign and malignant. On the other hand, in the present embodiment of the present invention, an estimation method using the analysis (self-shape differential method) of the nucleus chromatin distribution that takes the nucleus shape into consideration is used in an aim of estimating the degree of malignancy (e.g., an estimation of recurrence prognosis, expectation of lymph node metastasis etc.).

In the above embodiment, the chromatin index CI is calculated using the equation (1), however, the chromatin index CI may be calculated using any one of the following equations (2) to (4). That is, the chromatin index CI is calculated, which substantially exclude the information of the nucleus shaped image data and which substantially includes the information of the pattern of the pattern image data, using any one of the following equations (2) to (4).

$$CI = (bD_B - aD_A)/cD_A \quad (2),$$

where "a" is a predetermined first constant, "b" is a predetermined second constant, and "c" is a predetermined third constant. Preferably, a=1, b=1, and c=1, for example.

$$CI = dD_B/D_A \quad (3),$$

where "d" is a predetermined fourth constant. Preferably, d=1, for example.

$$CI = dD_A/D_B \quad (4),$$

where "e" is a predetermined fifth constant. Preferably, e=1, for example.

Figure 3:
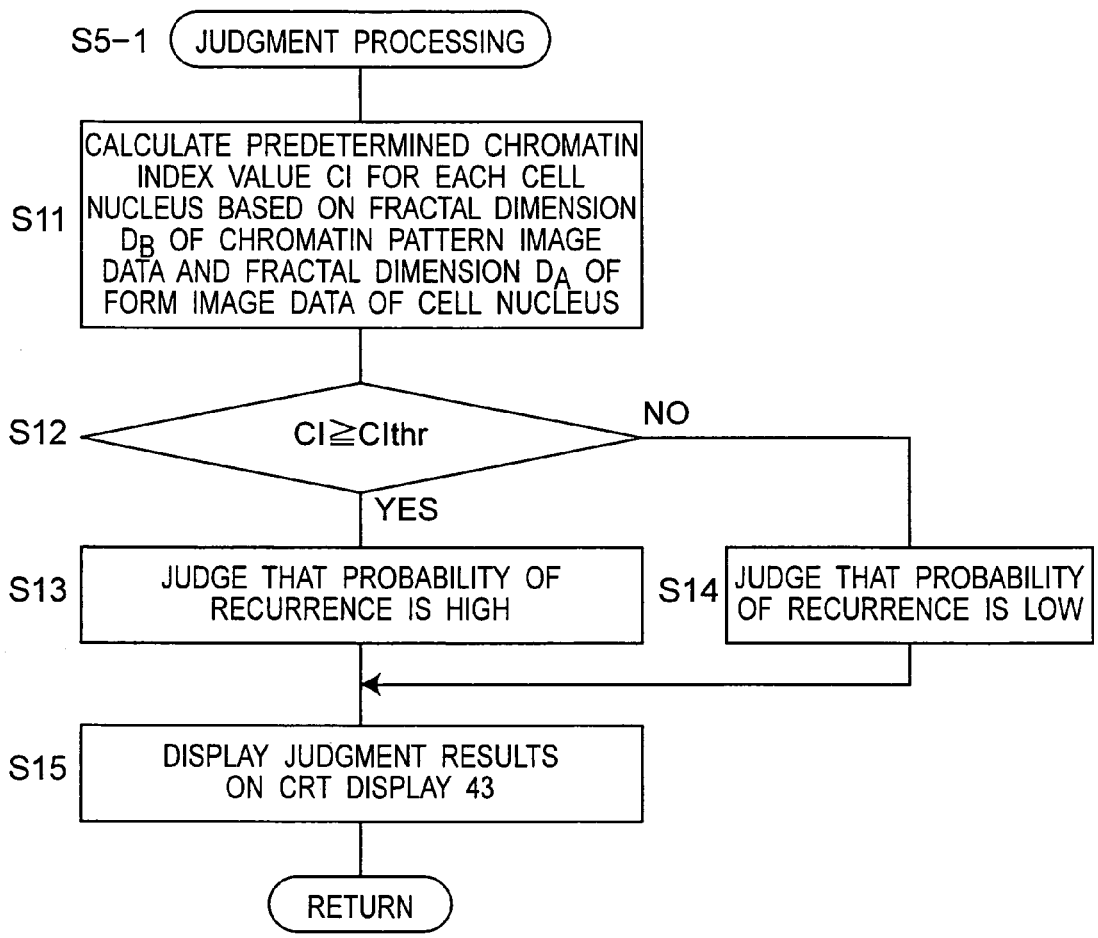
FIG. 3 is a flowchart showing a judgment processing (step S5-1) of a sub-routine of FIG. 2 according to the first implemental processing example.

The sub-routines for three implemental processing examples will be described hereinafter for each purpose of the judgment process (step S5) of FIG. 2. FIG. 3 is a flowchart showing a judgment processing (Step S5-1) of a sub-routine of FIG. 2 according to a first implemental processing example.

Referring to FIG. 3 showing a judgment processing (step S5-1) according to the first implemental processing example, the chromatin index CI is calculated using the equation (1) for each cell nucleus based on the fractal dimension $D_B$ of the chromatin pattern image data and the fractal dimension $D_A$ of the shape image data of the cell nucleus at step S11. At step S12, determination is made on whether or not CI≦CIthr, where CIthr denotes a threshold value for judging whether or not the possibility of recurrence of the breast cancer is high, and it is, for example, CIthr=0.2 (See an implemental example 1). The process flow proceeds to step S13 if YES at step S12, whereas the process flow proceeds to step S14 if NO at step S12. The process flow proceeds to step S15 if it is judged that the possibility of recurrence of the breast cancer is high at step S13. On the other hand, the process flow proceeds to step S15 if it is judged that the possibility of recurrence of the breast cancer is low at step S14. Furthermore, the judgment results are then outputted and displayed to and on the CRT display 43 at step S15, and the process flow returns to the original main routine.

Figure 4:
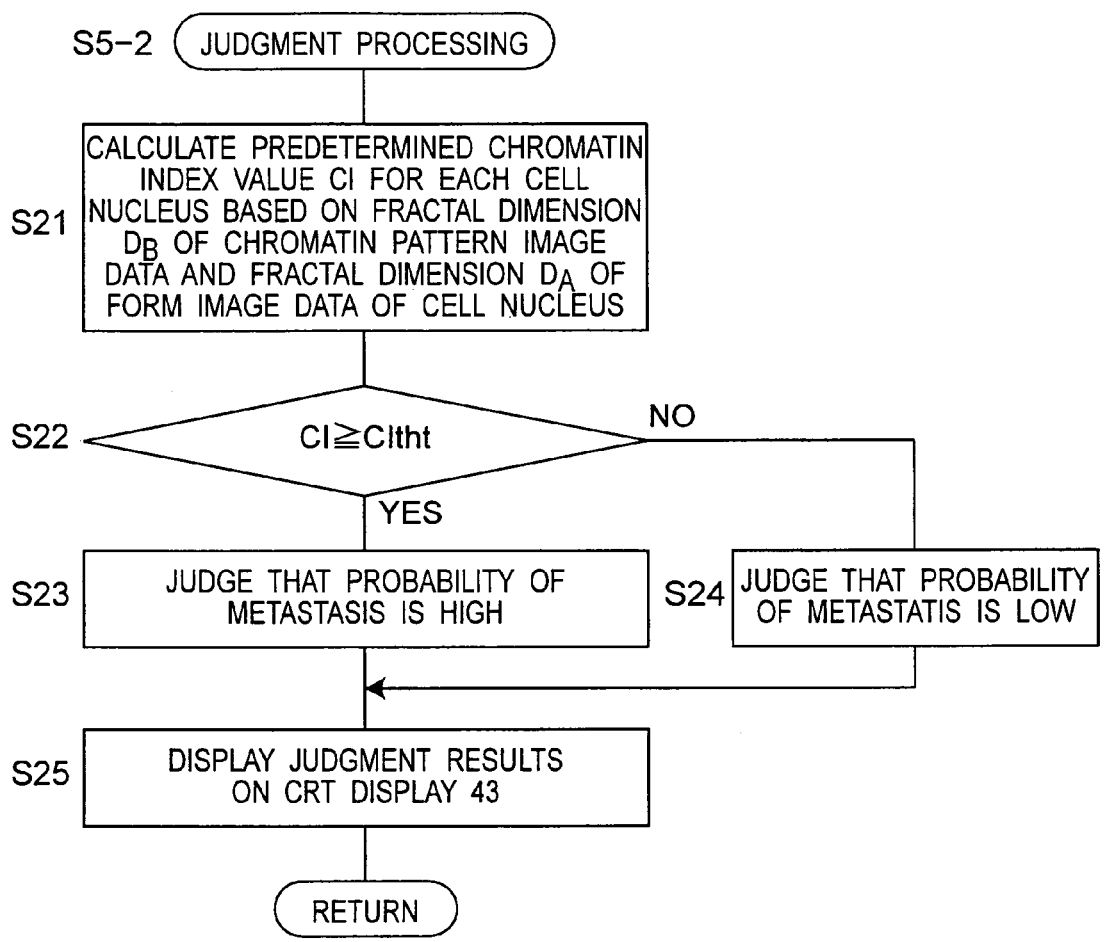
FIG. 4 is a flowchart showing a judgment processing (step S5-2) of a sub-routine of FIG. 2 according to the second implemental processing example.

FIG. 4 is a flowchart showing a judgment processing (step S5-2) of a sub-routine of FIG. 2 according to a second implemental processing example.

Referring to FIG. 4, the chromatin index CI is calculated using the equation (1) for each cell nucleus based on the fractal dimension $D_B$ of the chromatin pattern image data and the fractal dimension $D_A$ of the shape image data of the cell nucleus at step S21. At step S22, determination is made on whether or not CI≧CItht, where CItht denotes a threshold value for judging whether or not the metastasis to the lymph node of the breast cancer is high, and is for example, CItht=0.15 (See an implemental example 2). The process flow proceeds to step S23 if YES at step S22, whereas the process flow proceeds to step S24 if NO at step S22. The process flow proceeds to step S25 if it is judged that the possibility of metastasis of the breast cancer is high at step S23. On the other hand, the process flow proceeds to step S25 if it is judged that the possibility of metastasis of the breast cancer is low at step S24. Furthermore, the judgment results are then outputted to and displayed to and on the CRT display 43 at step S25, and the process flow returns to the original main routine.

Figure 5:
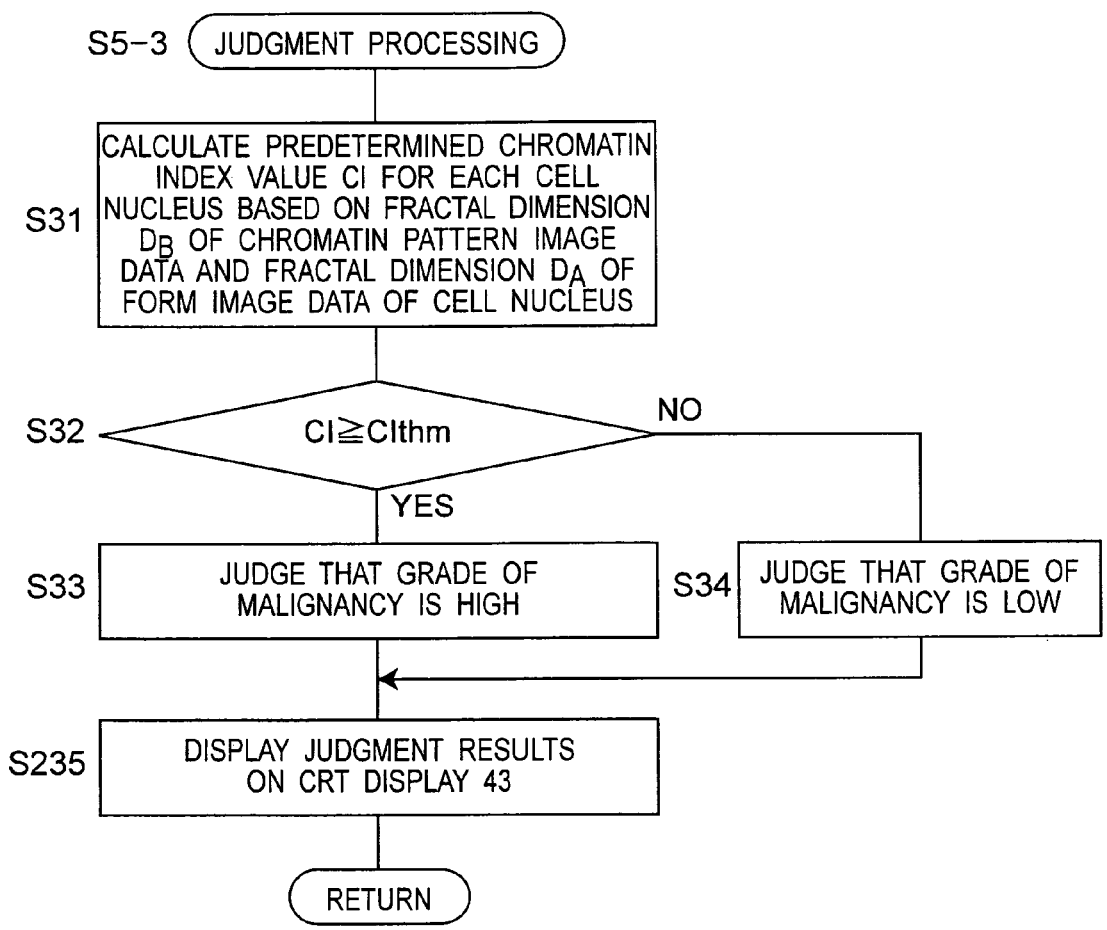
FIG. 5 is a flowchart showing a judgment processing (step S5-3) of a sub-routine of FIG. 2 according to the third implemental processing example.

FIG. 5 is a flowchart showing a judgment processing (step S5-3) of a sub-routine of FIG. 2 according to a third implemental processing example.

Referring to FIG. 5, the chromatin index CI is calculated using the equation (1) for each cell nucleus based on the fractal dimension $D_B$ of the chromatin pattern image data and the fractal dimension $D_A$ of the shape image data of cell nucleus at step S31. At step S32, determination is made on whether or not CI≧CIthm, where CIthm is a threshold value for judging whether or not the grade of malignancy of the breast cancer is high, and is for example, CIthm=0.15 (See the implemental example 2 etc.). The process flow proceeds to step S33 if YES at step S32, whereas the process flow proceeds to step S34 if NO at step S32. The process flow proceeds to step S35 if it is judged that the grade of malignancy of the breast cancer is high at step S33. On the other hand, the process flow proceeds to step S35 if it is judged that the grade of malignancy of the breast cancer is low at step S34. Furthermore the judgment results are then outputted to and displayed on the CRT display 43 at step S35, and the process flow returns to the original main routine.

The threshold value CIthr (threshold value for recurrence), CItht (threshold value for metastasis to lymph node), and CIthm (threshold value for grade of malignancy) are determined in advance clinically or experimentally by calculating (See, e.g., the implemental examples 1 and 2, which will be described hereinafter) the average value or the maximum value based on the image data of a plurality of breast cancer cell nuclei where the above described properties of the breast cancer have been known.

Effects of Embodiments

As discussed above, according to the medical image processing apparatus and method according to the embodiment of the present invention, the index value CI is calculated which substantially excludes the information of the image data related to the shape of the living body and which substantially includes the information of the pattern of the pattern image data, and the property or its degree of the living body is judged based on the calculated index value, and this leads to that the property or its degree of the living body can be quantitatively judged with accuracy higher than that of the prior art and with an extremely simple processing method. For example, the index for quantitatively estimating the prognosis of cancer recurrence, metastasis of cancer, and grade of malignancy of cancer can be obtained by calculating and analyzing a plurality of fractal dimensions of different recurrent examples and tumor diameter in advance. Whether the grade of malignancy of the cancer is higher or lower is objectively and quantitatively judged by comparing the chromatin index CI of the living body with the threshold value of the grade of malignancy of the cancer determined in advance.

Modified Embodiments

In the present embodiment, the image processing program data of FIG. 2 is loaded in the program memory 24 and is then executed when storing and executing the same program in the CD-ROM 45a, however, the present invention is not limited thereto, and the same program may be stored in various kinds of recording media such as recording media of optical disc or magnetic optical disc such as CD-R, CD-RW, DVD, MO etc.; or recording medium of magnetic disc such as floppy (registered trademark) disc etc. These recording media are each a computer readable recording medium. The image processing may be executed with the data of the same image processing program of FIG. 2 stored in the program memory 24 in advance.

IMPLEMENTAL EXAMPLE 1

In the implemental example 1, the fractal analysis and morphological review of the chromatin pattern of the cell nuclei serving as the prognostic factor of breast cancer is performed.

(1) Purpose

The fractal analysis and the morphological review were performed in an aim of clarifying whether or not the nucleus chromatin pattern of the cancerous cell of the mammary gland absorption biopsy material can serve as the prognostic factor of recurrence.

(2) Method

The subjects were 69 cases (including recurrent examples: 14 cases, non-recurrent examples (n1.24 cases, n0.31 case)) of infiltrative lactiferous cancer. The details thereof are as shown in FIG. 8. The non-recurrent examples n1 were of lymph node metastasis, and the non-recurrent examples n0 were of no lymph node metastasis. In the same review, the fractal dimension analysis was performed using the chromatin index CI indicating the complexity of the chromatin distribution. The image data of the nucleus chromatin pattern was obtained by photographing the chromatin pattern with the CCD digital camera 2, the fractal dimension analysis was performed thereon, the chromatin index CI that took into consideration the nucleus shape irregularity was calculated, and then, the complexity of the chromatin pattern was reviewed. The target samples were all primary lesion before recurrence.

Figure 12:
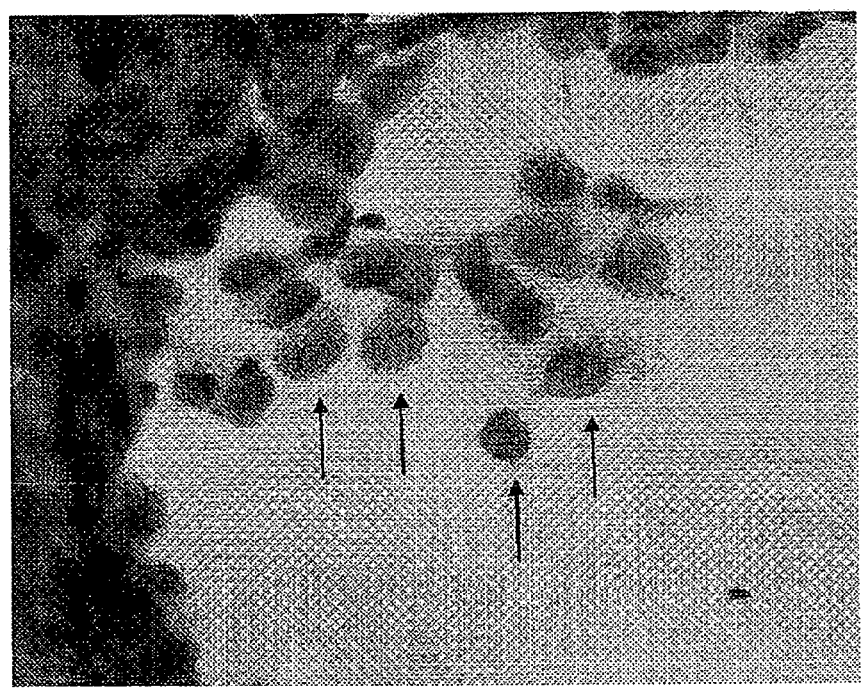
FIG. 12 is a photograph showing one example of the image data including a plurality of cell nuclei as stored by the image input processing of FIG. 2.
Figure 23:
FIG. 23 is an X-ray image of a typical breast cancer according to an implemental example 4, and is a photograph showing calcification of the same breast cancer.

FIG. 12 is a photograph showing one example of image data including a plurality of cell nuclei as stored by the image input processing of FIG. 2 in the implemental example 1. In the implemental example 1, the image was photographed with a BX51 microscope 1 manufactured by Olympus Co. and a digital camera 2 (magnification ×600) manufactured by Nikon Co. for samples of 1577 nuclei of the 69 obtained cases, and the image data of only the target cell nucleus was obtained. The file of the image data each have a format of a bit map file of an arbitrary size. The photograph in the figure attached to the present application has a format of JPEG file of gray scale due to restrictions of the on-line application to be submitted with the JPO. The photographing conditions were all the same conditions. The extracted examples of the analyzed image are shown in FIG. 23.

Figure 13:
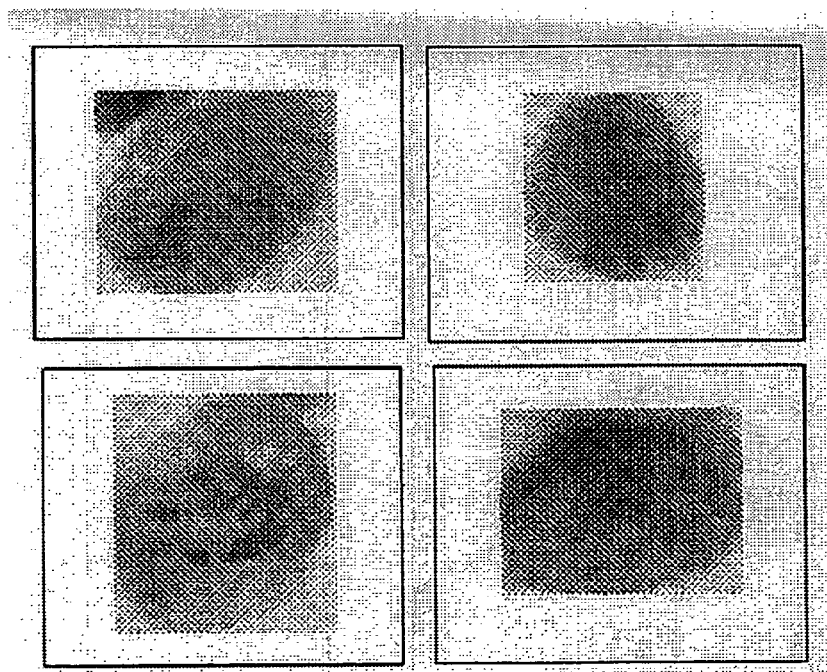
FIG. 13 is a photograph showing one example of the image data for each cell nucleus as extracted by the first image analysis processing of FIG. 2 from the image data of FIG. 11.
Figure 14:
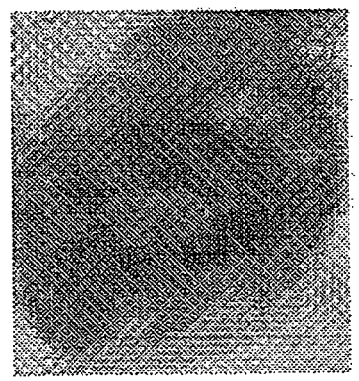
FIG. 14 is a photograph showing one example of image data (original image data is color image data of 1064 million colors, however, the image data converted to the image data of gray scale is shown in FIG. 14) of a certain cell nucleus extracted by the first image analysis processing of FIG. 2.
Figure 15:
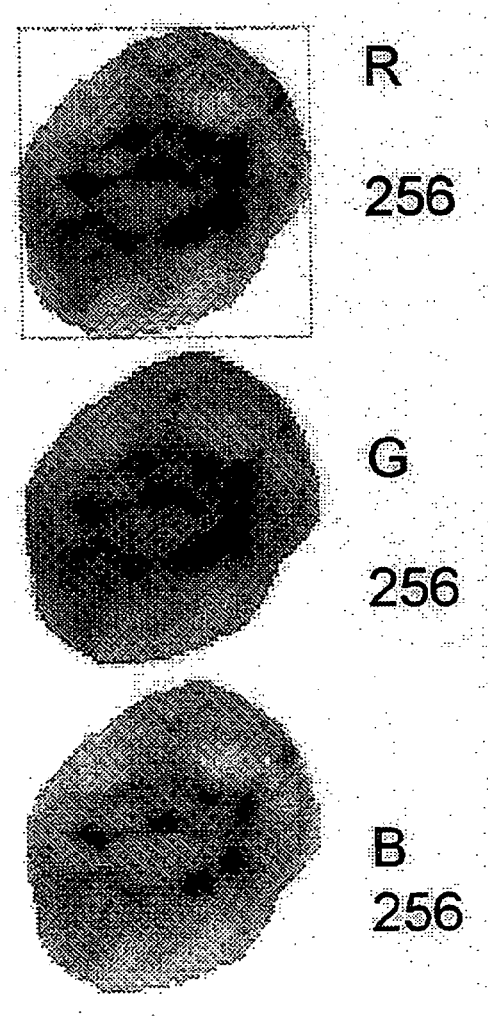
FIG. 15 is a photograph showing one example of image data according to respective colors of R, G and B for the image data of FIG. 14.
Figure 16:
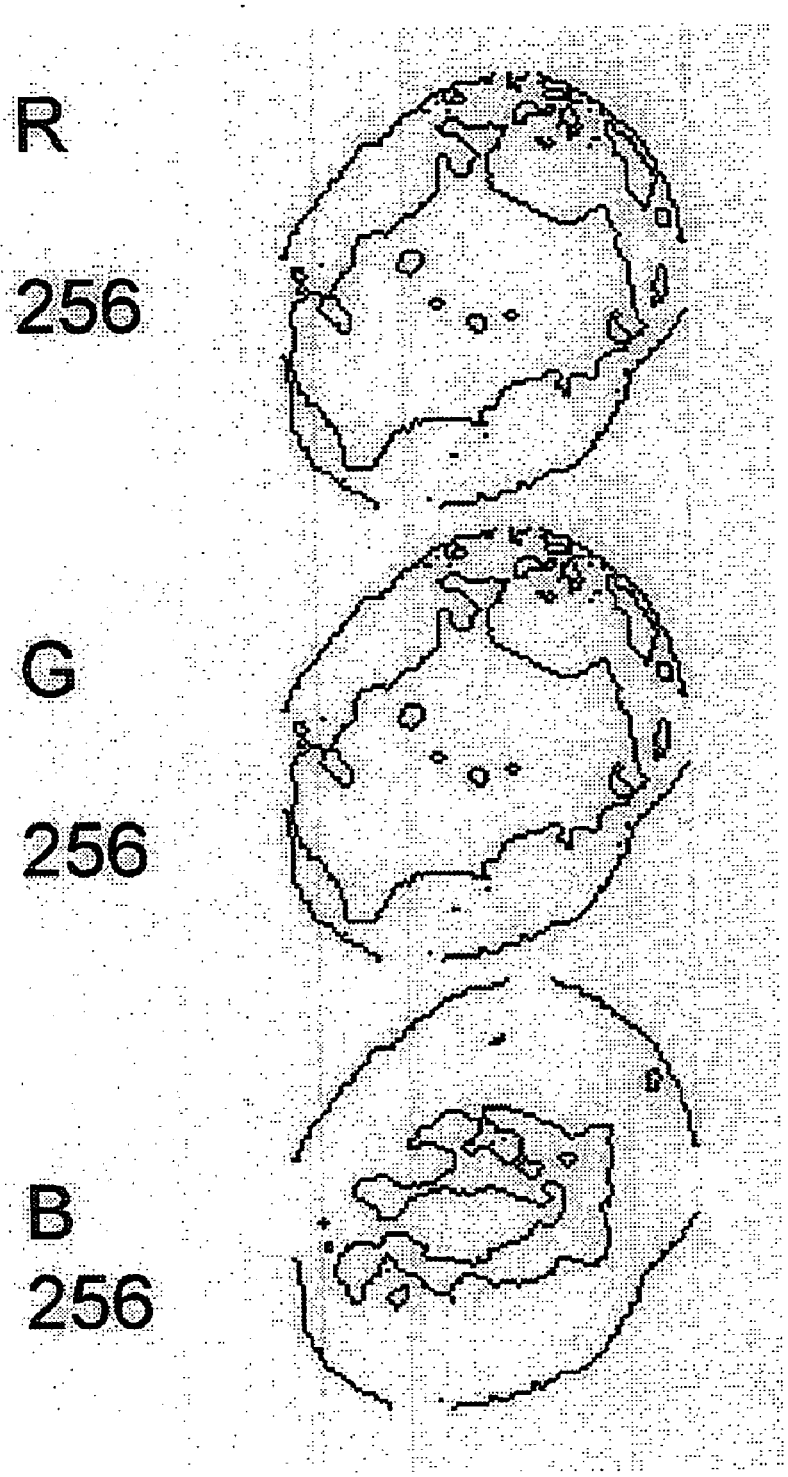
FIG. 16 is a photograph showing one example of image data of respective colors of R, G and B after a binarization processing and an edge processing by the first image analysis processing of FIG. 2 on the image data of respective colors of R, G, and B of FIG. 15.

FIG. 13 is a photograph showing one example of image data for each cell nucleus extracted from the image data of FIG. 11 by the first image analysis processing of FIG. 2, and FIG. 14 shows an image of full color image data of one cell nucleus. The image data of FIG. 12 was inputted to the medical image processing apparatus 10 of FIG. 2, a predetermined image analysis processing was performed on the input image data, and the image data for discriminating the chromatin distribution was obtained. In this case, the edge extraction processing for extracting the profile of the cell nucleus chromatin was performed as the image analysis processing. There was used the image data to be measured is the RGB image data, and the image data worth of 21 gradation parts between 80 to 150 gradations out of 256 gradations for each color image (that are each gradation part in 10 gradation steps, that is, they are obtained when 80 gradations, 90 gradation, 100 gradations, . . . , 150 gradations are used as the threshold value). The RGB image data before the edge extraction processing on the cell nucleus chromatin image data of FIG. 14 is shown in FIG. 15, and the RGB image data after the edge extraction processing is shown in FIG. 16.

The profiles were extracted based on the RGB image data after the edge extraction processing, and the fractal dimension $D_B$ of the chromatin pattern image data on the interior of the profile, and the fractal dimension $D_A$ of the nucleus shaped image data of only the profile information by black painting all interior of the profile were calculated using the box counting method. The chromatin index CI was then calculated using the equation (1) (a=1, and b=1). The examples of the calculation results are shown in FIGS. 17 and 18.

Figure 17:
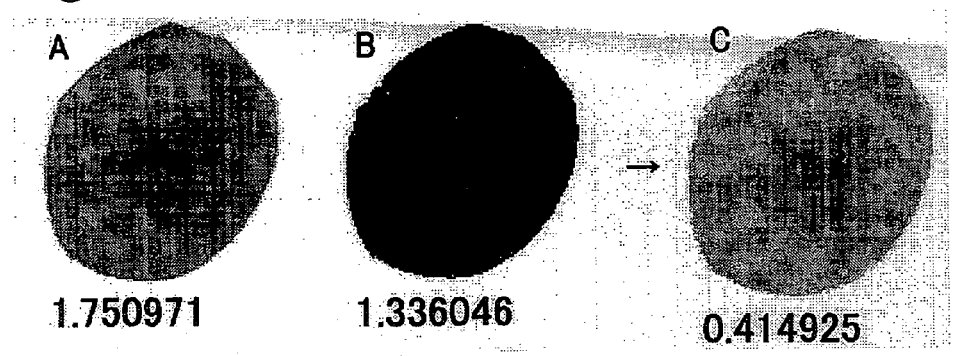
FIG. 17 shows photographs where "A" shows a photograph of chromatin image data after the first image analysis processing of FIG. 2 with respect to cell nucleus image data of a first experimental example, and a fractal dimension $D_A$ as calculated by the fractal arithmetic processing of FIG. 2 according to this, "B" shows a photograph showing one example of image data of nucleus shaped image data after a second image analysis processing of FIG. 2 and a fractal dimension $D_B$ as calculated by the fractal arithmetic processing of FIG. 2 according to this, and "C" shows a photograph showing one example of chromatin image data after the first image analysis processing of FIG. 2 and a chromatin index CI value as calculated by the fractal arithmetic processing of FIG. 2 according to this.
Figure 18:
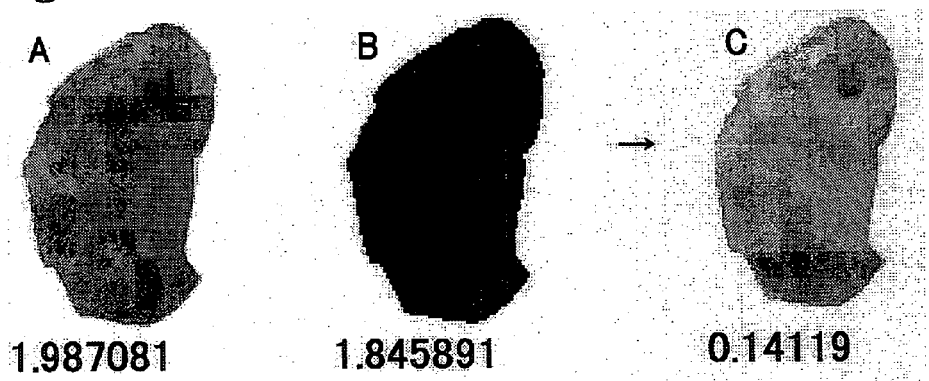
FIG. 18 is a view where "A" shows a photograph of chromatin image data after the first image analysis processing of FIG. 2 with respect to cell nucleus image data of a second experimental example, and a fractal dimension $D_A$ as calculated by the fractal arithmetic processing of FIG. 2 according to this, "B" shows a photograph showing one example of image data of nucleus shaped image data after the second image analysis processing of FIG. 2 and a fractal dimension $D_B$ as calculated by the fractal arithmetic processing of FIG. 2, and "C" shows a photograph showing one example of chromatin image data after the first image analysis processing of FIG. 2 and a chromatin index CI value as calculated by the fractal arithmetic processing of FIG. 2 according to this.

In FIG. 17, "A" shows a photograph of chromatin image data after the first image analysis processing of FIG. 2 with respect to cell nucleus image data of a first experimental example, and a fractal dimension $D_A$ as calculated by the fractal arithmetic processing of FIG. 2 according to this, "B" shows a photograph showing one example of image data of nucleus shaped image data after a second image analysis processing of FIG. 2 and a fractal dimension $D_B$ as calculated by the fractal arithmetic processing of FIG. 2 according to this, and "C" shows a photograph showing one example of chromatin image data after the first image analysis processing of FIG. 2 and a chromatin index CI value as calculated by the fractal arithmetic processing of FIG. 2 according to this. In FIG. 18, "A" shows a photograph of chromatin image data after the first image analysis processing of FIG. 2 with respect to cell nucleus image data of a second experimental example, and a fractal dimension $D_A$ as calculated by the fractal arithmetic processing of FIG. 2 according to this, "B" shows a photograph showing one example of image data of nucleus shaped image data after the second image analysis processing of FIG. 2 and a fractal dimension $D_B$ as calculated by the fractal arithmetic processing of FIG. 2, and "C" shows a photograph showing one example of chromatin image data after the first image analysis processing of FIG. 2 and a chromatin index CI value as calculated by the fractal arithmetic processing of FIG. 2 according to this. It is noted that the equation (1) (a=1, and b=1) was used in the calculation of the chromatic index value CI in FIGS. 17 and 18.

That is, the chromatin index value CI was calculated using the equation (1) (a=1, and b=1) based on the fractal dimensionality $D_A$ of the nucleus shape and the maximum value number $D_B$ of the fractal dimensionality indicating the maximum complexity of the chromatin distribution (as described above, a plurality of fractal dimension $D_B$ is calculated by changing the threshold value for each color image data of R, G, and B to obtain the maximum value). As apparent from FIGS. 17 and 18, the quantitative estimation of the grade of malignancy could be done based on the fractal dimension of the chromatin pattern by subtracting the fractal dimensionality influenced by the nucleus irregularity taking the shape component involved in the nucleus chromatin pattern into consideration. That is, such a quantitative estimation could be done that the grade of malignancy is high if the chromatin index value is high.

Figure 19:
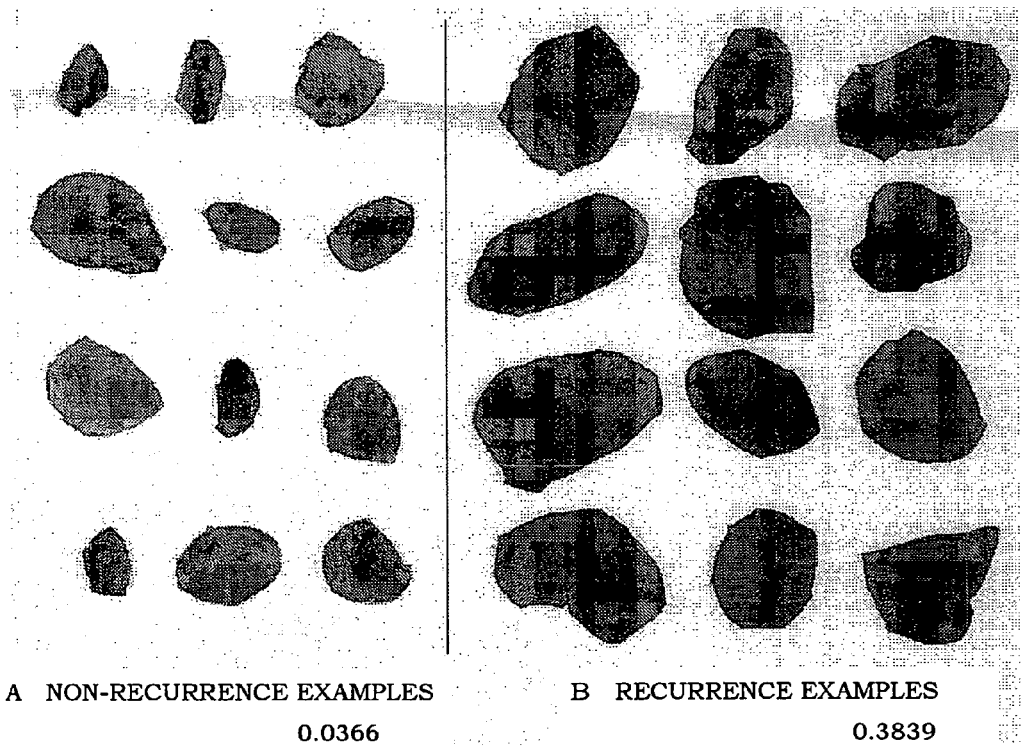
FIG. 19 is a photograph showing each chromatin pattern image data of when a plurality of cell nuclei of the cases in the implemental example 1 are divided into non-recurrent examples (A) and recurrent examples (B), and an average value of the chromatin index value CI of the results of the processing for analysis and estimation of FIG. 2 according to this.

FIG. 19 is a photograph showing each chromatin pattern image data of when a plurality of cell nuclei of the cases in the implemental example 1 are divided into non-recurrent examples (A) and recurrent examples (B), and the average value of the chromatin index value CI of the results of the processing for analysis and estimation of FIG. 2. As apparent from FIG. 19, the chromatin index value CI had a larger value for the recurrent examples than that in the non-recurrent examples, and this indicates increase in chromatin dye affinity and irregular rough structure chromatin aspect.

Figure 9:
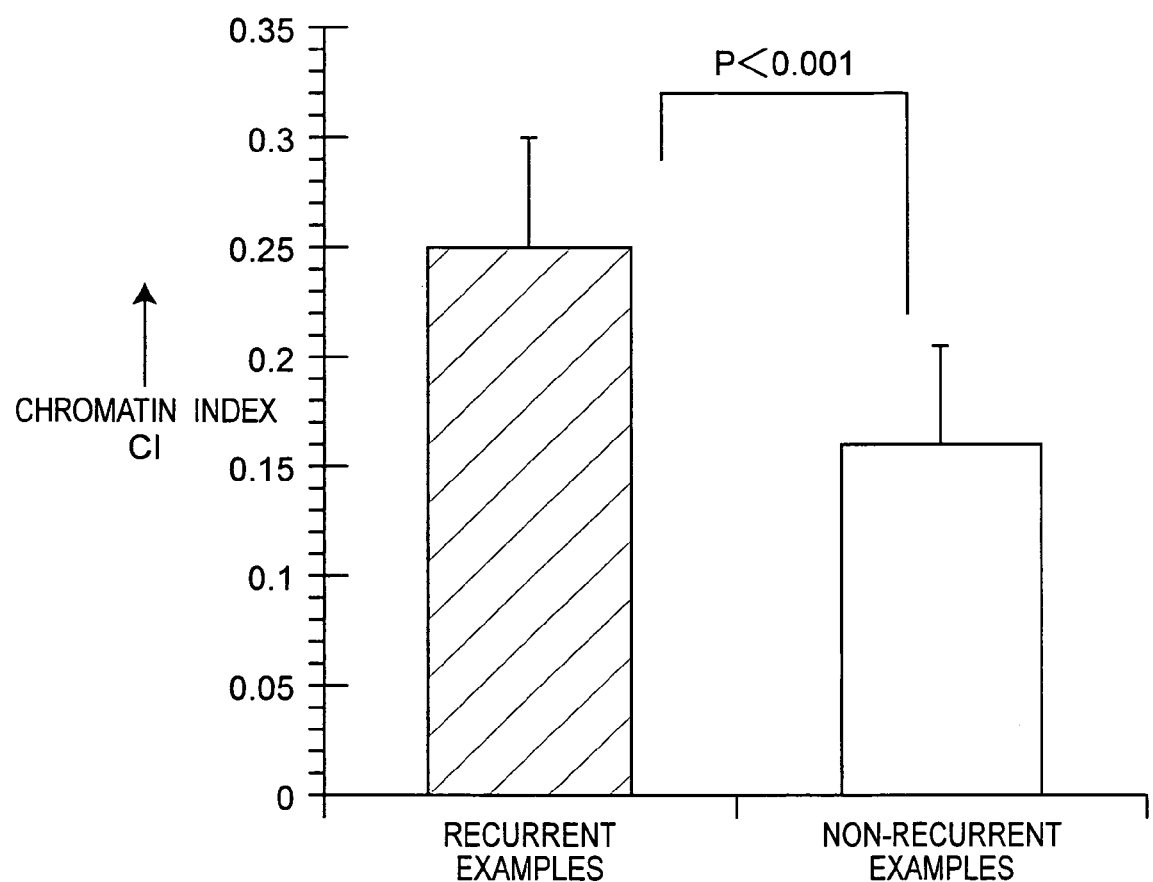
FIG. 9 is a graph showing results of the processing for analysis and estimation for the cell nucleus of the cases in the implemental example 1, and is a view showing that a chromatin index value CI of the recurrent examples and the non-recurrent examples has a statistically significant difference (P<0.001)

FIG. 9 is a graph showing results of a processing for analysis and estimation for the cell nucleus of the cases in the implemental example 1, and showing that the chromatin index value CI of the recurrent examples and the non-recurrent examples has statistically significant difference (P<0.001). As apparent from FIG. 9, the chromatin index values CI (P<0.001) of the recurrent examples and the non-recurrent examples have a statistically significant difference.

Figure 20:
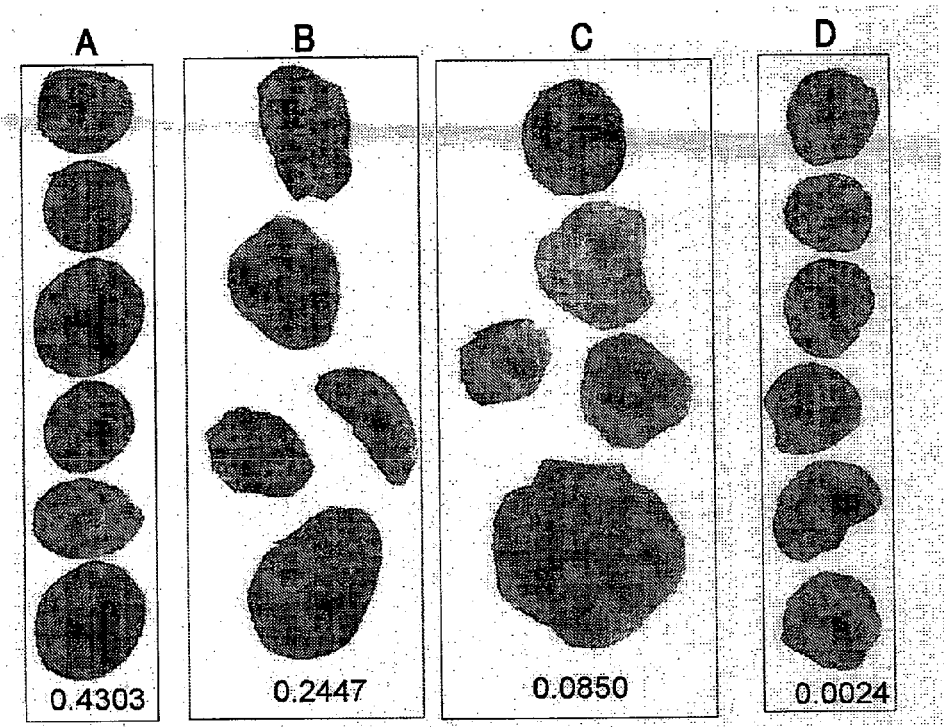
FIG. 20 is a photograph showing a plurality of chromatin pattern image data for four malignant examples A, B, C and D according to the implemental example 1 and an average value of the chromatin index value CI of respective malignant examples.

FIG. 20 is a photograph showing a plurality of chromatin pattern image data for four malignant examples A, B, C and D according to the implemental example 1 and the average value of the chromatin index value CI of each malignant example. As apparent from FIG. 20, the appearance of the nuclear body and the irregular distribution of the chromatin could be grossly recognized from the chromatin image, however, it was difficult to discriminate differences among these cases, the grade of malignancy and the prediction of recurrence. On the other hand, a significant difference was found from the average value of the chromatin index CI. The nucleus chromatin images of A, B, C and D shown in FIG. 20 all satisfy the malignance findings morphologically, however, the estimation of the grade of malignancy is inaccurate and lacks in reproducibility in the gross observation of the morphological chromatin pattern according to the prior art. The prediction of recurrence was considered to be difficult to perform from the cell nucleus chromatin pattern, and discrimination was a qualitative representation.

(3) Conclusions

As apparent from the results of the implemental example 1 described above, the chromatin index value CI had a large value for 85% (12/14 cases) of the recurrent breast cancer cases, the significant difference (P<0.001) was recognized between the recurrent breast cancer example and the non-breast cancer example groups, thus suggesting irregularity of the chromatin distribution. 84% (21/25 cases) of the non-recurrent examples (n0) in which tumor diameter is less than 2.5 cm indicated a relatively low chromatin index value CI. A relatively large chromatin value CI was mostly found for the cases each having a tumor diameter greater than or equal to 2.5 cm of the non-recurrent examples (n1), and thus, correlation with the tumor diameter was recognized (P<0.001). The disease sensitivity rate, the disease specificity rate, and the disease accuracy rate were calculated from these results, and the results thereof are shown in FIGS. 10 and 11. As apparent from FIG. 10, extremely large disease sensitivity rate and disease accuracy rate were obtained. Furthermore, as apparent from FIG. 11, extremely high disease sensitivity rate, disease specificity rate and disease accuracy rate were obtained if the threshold values CItht and CIthr are changed in the estimation of lymph node metastasis and estimation of recurrence.

(4) Observation

From the results of the implemental example 1, the nucleus chromatin of the recurrent breast cancer example was predicted to have a certain morphological feature. The chromatin in the recurrent breast cancer example was recognized with a plurality of rough agglomerated chromatin in the periphery of the nuclear body, and the distribution was irregular. The agglomerate chromatin was found in the vicinity of the nuclear membrane of the cell that shows brightness on the inside of the nucleus and fine agglomerated chromatin. The fractal dimension analysis was performed for the nucleus chromatin pattern, and the chromatin index value CI was calculated to quantitatively and numerically convert the irregularity of the nucleus chromatin pattern. The quantization (numerical conversion) of the pattern allows prediction of recurrence and qualitative estimation of the grade of malignancy, and this leads to providing of clinical information effective for primary care.

IMPLEMENTAL EXAMPLE 2

A method of judging the recurrent examples, the lymph node metastasis example, and the biological grade of malignancy of the object to be detected based on the fractal dimension calculated in the implemental example 1 will be described hereinafter.

The available cell nucleus samples were photographed with BX51 microscope 1 manufactured by Olympus Co. and the CCD digital camera 2 (magnification ×600) manufactured by Nikon Co., and the image data (bit map file) of the cell nucleus samples was created. The photographing conditions were the same conditions as those of the implemental example 1. The same data is inputted to the medial image processing apparatus of FIG. 1, the processing for analysis and estimation of FIG. 2 was performed, and the judgment processing by purpose of FIGS. 3 to 5 were performed. That is, in the judgment processing by purpose (recurrent examples, lymph node metastasis example, biological grade of malignancy) of FIGS. 3 to 5, the calculated chromatin index value CI was compared with the threshold value CIthr, CItht, and CIthm set for each purpose to objectively judge the possibility of recurrence of cancer, the possibility of metastasis to lymph node, and the grade of malignancy of cancer. The threshold value was determined based on the clinical results of FIGS. 10 and 11. In the present specification, the biological grade of malignancy is a dominant concept of the degree of recurrence and the degree of metastasis to lymph node, and it is referred to as a "grade of malignance or the like" including these.

IMPLEMENTAL EXAMPLE 3

The principal of the present invention is assumed to have applicability to a method of estimating the medical image. Upon estimating the uneven pattern distribution within the object to be observed in which the observed image is made up of indefinite shape, the estimation method that takes into account the shape of the profile or the collection thereof becomes important. The medical images have been known to include ambiguous shapes and/or images each having fractal property, and in particular, they are effective in observing and estimating the lesion on a daily basis in the clinical medicine of image finding or the like such as X-rays, mammography (X-ray mammography method), MRI (Magnetic Resonance Imaging), X-ray CT (X-ray Computed Tomography), PET (Position-emission Tomography), ultrasonic echo etc. The findings of these images have been used on a daily basis when observing the lesion such as the organs (salivary gland, thyroid gland, lymph node, mammary gland, liver, pancreas, kidney, prostate gland, spleen) etc. of the human body, and also possibly for the estimation thereof. Upon estimating the shape of the lesion, irregularity in the lesion or the like, the estimation method similar to that of the present invention is assumed as one effective estimation method. The implemental example will be described hereinafter.

Figure 21:
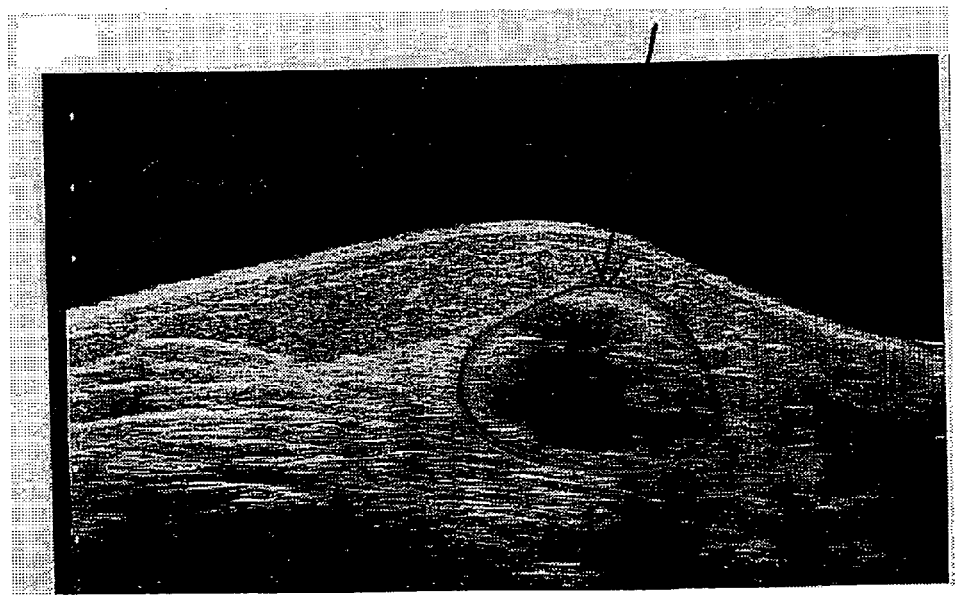
FIG. 21 is an ultrasonic echo image of a typical breast cancer according to an implemental example 3, and is a photograph showing irregularity and uneven internal low echo of the same breast cancer.

FIG. 21 is an ultrasonic echo image of a typical breast cancer according to the implemental example 3, and is a photograph showing irregularity and uneven internal low echo of the same breast cancer. FIG. 21 is an image scanned at an interval of 2.5 mm, where a tumor mass image of 2.5 cm was found at the center. The tumor mass image is nodular with irregular side edges, the inside presenting an uneven low echo, and further, a strong boundary echo image was found at the front surface of the tumor.

Figure 22:
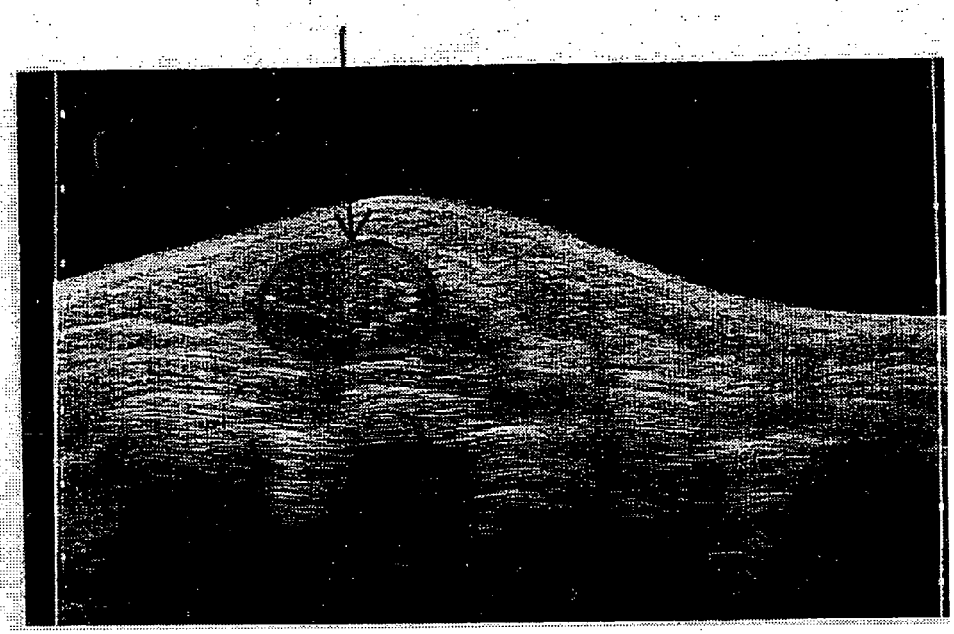
FIG. 22 is an ultrasonic echo image of a typical breast cancer according to the implemental example 3, and is a photograph showing internal unevenness and calcification of the same breast cancer.

FIG. 22 is an ultrasonic echo image of a typical breast cancer according to the implemental example 3, and is a photograph showing internal unevenness and calcification of the same breast cancer. FIG. 22 is an example of a tumor having an irregular side edge and a smooth side edge, and discrimination from the fibroadenoma tumor was rather difficult for the same tumor of FIG. 22. However, a strong dot shaped echo image was found inside the tumor. This cancer involves calcification.

FIGS. 21 and 22 shows ultrasonic images of mammary gland, however, when the dimension of the outline or profile and the fractal dimension that becomes the index for internal echo unevenness upon estimating the shape of the lesion part and the internal echo were obtained, the grade of malignancy of the lesion part could be judged by numerically formulizing the image information from the same tumor lesion, and calculating the index value using an equation similar to that of the chromatin index CI.

IMPLEMENTAL EXAMPLE 4

FIG. 23 is an X-ray image of a typical breast cancer according to an implemental example 4, and is a photograph showing calcification of the same breast cancer. Referring to FIG. 23, any clear tumor opacity was not found, however, the calcified image of medium amount was collectively found on the right side of the breast. When pressure spot photographing was performed, the calcified image was articulately drawn out, and the individual calcified image presents wide arrays of images such as substantially cylinder shape, V-shape, rod shape, comma shape or the like. The calcified images were arrayed in a linear shape in the direction of the mammilla.

FIG. 23 is an X-ray image (mammography image) of the breast cancer, however, when obtaining the dimension of the profile or outline and the fractal dimension that becomes the index of the inner calcification upon estimating the calcification shape of the lesion shape are obtained, the grade of malignancy of the lesion part could be judged by numerically formulizing the image information from the same tumor lesion, and calculating the index value using an equation similar to that of the chromatin index CI. As known to those skilled in the art, the shape of the calcification region has a feature of being scattered, even size, circular etc. in benign calcification, whereas the shape of the calcification region has a feature of being packed, different in size, anomaly in shape etc. in the malignance calcification, Therefore, the estimation on the grade of malignancy based on calcification could be more accurately performed by estimating the pattern of calcification using the fractal dimension $D_B$, and eliminating the information of the fractal dimension $D_A$ according to the shape of the lesion part.

In the above-mentioned implemental examples, cases of applying the chromatic index CI of the present invention for organs or epithelial lesion parts such as breast cancer has been explained, however, the present invention is not limited thereto, and the index value CI may be applied to non-epithelial cancer such as bone, blood, muscles, etc. The reference characters or symbol CI is used as the chromatin index, however, the reference characters or symbol CI does not means only any index of chromatin.

INDUSTRIAL APPLICABILITY

As described in detail above, according to the medical image processing apparatus and method according to the present invention, the predetermined image analysis processing is performed on the image data of the living body to obtain the shape image data obtained by extracting the profile of the living body, and the pattern image data obtained by extracting the pattern on the interior of the profile of the living body. The fractal dimension $D_A$ of the shape image data is calculated and the fractal dimension $D_B$ of the pattern image data is calculated based on the obtained shape image data and the pattern image data, and then, the index value CI is calculated, which substantially excludes the information of the shape image data, and substantially includes the information of the pattern of the pattern image data, based on the fractal dimension $D_A$ of the shape image data and the fractal dimension $D_B$ of the pattern image data. Furthermore, the properties of the living body are judged based on the calculated index value. Accordingly, since the index value CI is calculated, which substantially excludes the information of the image data related to the shape of the living body and substantially includes the information of the pattern of the pattern image data, and the properties of the living body are judged based on the calculated index value, the properties of the living body are judged quantitatively with accuracy higher than that of the prior art and with an extremely simple processing method.

In particular, the medical processing apparatus and method according to the present invention for providing a quantitative index of the cell nucleus chromatin distribution configuration is effective as an objective index of the observer, and provides treatment selecting information before operation and after operation as the index of grade of malignancy. For example, the present invention is applicable to experimental medicine, applied medicine, biology, basic science, or the like, that requires cell nucleus estimation etc., and is used in all the fields that handle cells such as in estimation of the cell nucleus of the living body, the cell nucleus of experimental animal, and the cultured cell nucleus. Moreover, the medical image processing apparatus and method according to the present invention are not limited to the estimation of the cell nucleus, and can be widely applied to the estimation of one part of organs or the lesion parts of the living body.

The invention claimed is:

1. A medical image processing apparatus for analyzing properties of a living body based on image data of the living body, said medical image processing apparatus comprising:
    an image analyzing device for executing a predetermined image analysis processing on the image data of the living body to obtain shape image data, obtained by extracting a profile of the living body, and pattern image data, obtained by extracting pattern information of an interior of the profile of the living body;
    a calculation device for calculating a fractal dimension $D_A$ of the shape image data, and calculating a fractal dimension $D_B$ of the pattern image data based on the obtained shape image data and the obtained pattern image data, and then, calculating an index value CI based on the fractal dimension $D_A$ of the shape image data and the fractal dimension $D_B$ of the pattern image data, the calculated index value representing only the pattern information of the pattern image data; and
    a judgment device for judging the properties of the living body based on the calculated index value.

2. The medical image processing apparatus as claimed in claim 1,
    wherein said calculation device calculates the index value CI using an equation of $CI=bD_B-aD_A$ (where "a" is a predetermined first constant, and "b" is a predetermined second constant).

3. The medical image processing apparatus as claimed in claim 1,
    wherein said calculation device calculates the index value CI using an equation of $CI=(bD_B-aD_A)/cD_A$ (where "a" is a predetermined first constant, "b" is a predetermined second constant, and "c" is a predetermined third constant).

4. The medical image processing apparatus as claimed in claim 1,
    wherein said calculation device calculates the index value CI using an equation of $CI=dD_B/D_A$ (where "d" is a predetermined fourth constant).

5. The medical image processing apparatus as claimed in claim 1,
    wherein said calculation device calculates the index value CI using an equation of $CI=eD_A/D_B$ (where "e" is a predetermined fifth constant).

6. The medical image processing apparatus as claimed in claim 1,
    wherein said judgment device judges the properties of the living body by comparing the calculated index value with a predetermined threshold value.

7. The medical image processing apparatus as claimed in claim 6,
    wherein the threshold value is a value defined in advance for distinguishing the properties of the living body based on a plurality of image data of the living body where the properties of the living body are known.

8. The medical image processing apparatus as claimed in claim 1,
    wherein the image analysis processing includes at least one processing of edge processing and binarization processing.

9. The medical image processing apparatus as claimed in claim 8,
wherein the image analysis processing further includes a conversion processing from color image data to gray scale image data.

10. The medical image processing apparatus as claimed in claim 1,
wherein the living body is a cell nucleus, the image data of the living body is chromatin image data of the cell nucleus, and the pattern image data of the living body is chromatin pattern image data of the cell nucleus, and
wherein said judgment device judges biological estimation of the cell nucleus based on the calculated index value.

11. The medical image processing apparatus as claimed in claim 10,
wherein the biological estimation is a grade of malignancy of cancer of the cell nucleus.

12. The medical image processing apparatus as claimed in claim 1,
wherein the living body is a region of a part of an organism, and the image data of the living body is obtained by imaging the region of one part with a medical image pick-up equipment for imaging with a predetermined signal wave.

13. The medical image processing apparatus as claimed in claim 12,
wherein the living body is an organ of an organism, the shape image data is image data of shape of the organ, the pattern image data is image data indicating distribution of unevenness of a lesion part in the organ, and
wherein said judgment device judges the biological estimation of the lesion part in the organ based on the calculated index value.

14. A medical image processing method for analyzing properties of living body based on image data of the living body, said medical image processing method including the following steps of:
executing a predetermined image analysis processing on the image data of the living body to obtain shape image data, obtained by extracting a profile of the living body, and pattern image data, obtained by extracting pattern information of an interior of the profile of the living body;
calculating a fractal dimension $D_A$ of the shape image data, and calculating a fractal dimension $D_B$ of the pattern image data based on the obtained shape image data and the obtained pattern image data, and then, calculating an index value CI based on the fractal dimension $D_A$ of the shape image data and the fractal dimension $D_B$ of the pattern image data, the calculated index value representing only the pattern information of the pattern image data; and
judging the properties of the living body based on the calculated index value.

15. The medical image processing method as claimed in claim 14, wherein said calculation step calculates the index value CI using an equation of $CI=bD_B-aD_A$ (where "a" is a predetermined first constant, and "b" is a predetermined second constant).

16. The medical image processing method as claimed in claim 14,
wherein said calculation step calculates the index value CI using an equation of $CI=(bD_B-aD_A)/cD_A$ (where "a" is a predetermined first constant, "b" is a predetermined second constant, and "c" is a predetermined third constant).

17. The medical image processing method as claimed in claim 14,
wherein said calculation step calculates the index value CI using an equation of $CI=dD_B/D_A$ (where "d" is a predetermined fourth constant).

18. The medical image processing method as claimed in claim 14,
wherein said calculation step calculates the index value CI using an equation of $CI=eD_A/D_B$ (where "e" is a predetermined fifth constant).

19. The medical image processing method as claimed in claim 14,
wherein said judgment step judges the properties of the living body by comparing the calculated index value with a predetermined threshold value.

20. The medical image processing method as claimed in claim 19,
wherein the threshold value is a value defined in advance for distinguishing the properties of the living body based on a plurality of image data of the living body where the properties of the living body are known.

21. The medical image processing method as claimed in claim 14,
wherein the image analysis processing includes at least one processing of edge processing and binarization processing.

22. The medical image processing method as claimed in claim 21,
wherein the image analysis processing further includes a conversion processing from color image data to gray scale image data.

23. The medical image processing method as claimed in claim 14,
wherein the living body is a cell nucleus, the image data of the living body is chromatin image data of the cell nucleus, and the pattern image data of the living body is chromatin pattern image data of the cell nucleus, and
wherein said judgment step judges biological estimation of the cell nucleus based on the calculated index value.

24. The medical image processing method as claimed in claim 23,
wherein the biological estimation is a grade of malignancy of cancer of the cell nucleus.

25. The medical image processing method as claimed in claim 14,
wherein the living body is a region of a part of an organism, and the image data of the living body is obtained by imaging the region of one part with a medical image pick-up equipment for imaging with a predetermined signal wave.

26. The medical image processing method as claimed in claim 25,
wherein the living body is an organ of an organism, the shape image data is image data of shape of the organ, the pattern image data is image data indicating distribution of unevenness of a lesion part in the organ, and
wherein said judgment step judges the biological estimation of the lesion part in the organ based on the calculated index value.

27. A non-transitory computer readable recording medium for recording a computer executable medical image processing program which processes respective steps of said medical image processing method as claimed in claim 14.

* * * * *